(12) United States Patent
Li et al.

(10) Patent No.: US 10,586,349 B2
(45) Date of Patent: Mar. 10, 2020

(54) EXCAVATOR BUCKET POSITIONING VIA MOBILE DEVICE

(71) Applicant: Trimble Inc., Sunnyvale, CA (US)

(72) Inventors: Ding Li, Superior, CO (US); Scott T. Crozier, Westminster, CO (US); Eric K. Wilson, Cupertino, CA (US)

(73) Assignee: Trimble Inc., Sunnyvale, CA (US)

( * ) Notice: Subject to any disclaimer, the term of this patent is extended or adjusted under 35 U.S.C. 154(b) by 141 days.

(21) Appl. No.: 15/685,617

(22) Filed: Aug. 24, 2017

(65) Prior Publication Data

US 2019/0066323 A1 Feb. 28, 2019

(51) Int. Cl.
| | |
|---|---|
| *G06T 7/70* | (2017.01) |
| *G06K 9/62* | (2006.01) |
| *G06F 3/14* | (2006.01) |
| *H04W 4/02* | (2018.01) |
| *E02F 9/26* | (2006.01) |
| *G06T 7/73* | (2017.01) |

(52) U.S. Cl.
CPC ............... *G06T 7/70* (2017.01); *E02F 9/264* (2013.01); *G06F 3/14* (2013.01); *G06K 9/6201* (2013.01); *G06T 7/74* (2017.01); *H04W 4/026* (2013.01); *G06T 2207/30164* (2013.01); *G06T 2207/30208* (2013.01)

(58) Field of Classification Search
None
See application file for complete search history.

(56) References Cited

U.S. PATENT DOCUMENTS

| | | | |
|---|---|---|---|
| 5,077,557 A | 12/1991 | Ingensand | |
| 5,432,712 A | 7/1995 | Chan | |
| 5,512,905 A | 4/1996 | Nichols et al. | |
| 5,642,285 A | 6/1997 | Woo et al. | |

(Continued)

FOREIGN PATENT DOCUMENTS

| | | |
|---|---|---|
| CN | 101763658 A | 6/2010 |
| DE | 19922321 | 7/2002 |

(Continued)

OTHER PUBLICATIONS

Feng, Chen. "Camera Marker Networks for Pose Estimation and Scene Understanding in Construction Automation and Robotics." (2015). (Year: 2015).*

(Continued)

*Primary Examiner* — Vu Le
*Assistant Examiner* — Tracy Mangialaschi
(74) *Attorney, Agent, or Firm* — Adsero IP

(57) ABSTRACT

Various embodiments provide novel tools and techniques for position and/or motion tracking, including without limitation solutions that can be used for excavation and similar applications. In a particular aspect of some embodiments, a communication device with a camera may be provided to track the position and motion of a stick of an excavator or reference features located on a stick of an excavator. A location of a bucket of an excavator may then be calculated relative to the stick or reference features on the stick of the excavator. Thus, an operator of the excavator can use the communication device to effectively and efficiently track the location of the excavator bucket without the need for a second person to provide instructions about the location of the bucket.

21 Claims, 17 Drawing Sheets

(56) References Cited

U.S. PATENT DOCUMENTS

| | | |
|---|---|---|
| 5,929,807 A | 7/1999 | Viney et al. |
| 6,034,722 A | 3/2000 | Viney et al. |
| 6,084,510 A | 7/2000 | Lemelson et al. |
| 6,144,308 A | 11/2000 | Dunne |
| 6,147,598 A | 11/2000 | Murphy et al. |
| 6,237,235 B1 | 5/2001 | Kaschke et al. |
| 6,282,362 B1 | 8/2001 | Murphy et al. |
| 6,859,269 B2 | 2/2005 | Ohtomo et al. |
| 6,873,407 B2 | 3/2005 | Vogel |
| 7,145,648 B2 | 12/2006 | Vogel |
| 7,149,366 B1 | 12/2006 | Sun |
| 7,184,072 B1 | 2/2007 | Loewen et al. |
| 7,339,611 B2 | 3/2008 | Marold et al. |
| 7,374,140 B2 | 5/2008 | Crain et al. |
| 7,526,384 B2 | 4/2009 | MacIntosh et al. |
| 7,541,974 B2 | 6/2009 | Scherzinger |
| 7,543,780 B1 | 6/2009 | Marshall et al. |
| 7,611,105 B1 | 11/2009 | Carazo |
| 7,619,561 B2 | 11/2009 | Scherzinger |
| 7,646,339 B2 | 1/2010 | Green et al. |
| 7,697,127 B2 | 4/2010 | Glimm et al. |
| 7,719,467 B2 | 5/2010 | Norda et al. |
| 7,940,211 B2 | 5/2011 | Scherzinger |
| 7,978,128 B2 | 7/2011 | Scherzinger |
| 7,991,575 B2 | 8/2011 | Vogel et al. |
| 8,024,144 B2 | 9/2011 | Kludas et al. |
| 8,045,762 B2 | 10/2011 | Otani et al. |
| 8,125,379 B2 | 2/2012 | Allison |
| 8,229,166 B2 | 7/2012 | Teng et al. |
| 8,285,512 B2 | 10/2012 | Vogel et al. |
| 8,348,166 B2 | 1/2013 | Hanson |
| 8,416,130 B2 | 4/2013 | Scherzinger |
| 8,427,632 B1 | 4/2013 | Nash et al. |
| 8,625,086 B2 | 1/2014 | Vogel et al. |
| 8,629,905 B2 | 1/2014 | Svanholm |
| 8,633,588 B2 | 1/2014 | Lin et al. |
| 8,754,805 B2 | 6/2014 | Wang et al. |
| 8,897,482 B2 | 11/2014 | Mein et al. |
| 8,994,822 B2 | 3/2015 | Smitherman et al. |
| 9,182,229 B2 | 11/2015 | Grasser et al. |
| 9,235,763 B2 | 1/2016 | Joyce et al. |
| 9,247,239 B2 | 1/2016 | He et al. |
| 9,354,045 B1 | 5/2016 | Best |
| 9,879,993 B2 | 1/2018 | McFadden et al. |
| 10,168,153 B2 | 1/2019 | Grasser et al. |
| 2002/0001406 A1 | 1/2002 | Kochi et al. |
| 2002/0012071 A1 | 1/2002 | Sun |
| 2003/0137449 A1 | 7/2003 | Vashisth et al. |
| 2003/0218540 A1 | 11/2003 | Cooper et al. |
| 2004/0105090 A1 | 6/2004 | Schultz et al. |
| 2004/0228517 A1 | 11/2004 | Massen |
| 2005/0025313 A1 | 2/2005 | Watchel et al. |
| 2005/0031197 A1 | 2/2005 | Knopp |
| 2005/0057745 A1 | 3/2005 | Bontje |
| 2005/0069195 A1 | 3/2005 | Uezono et al. |
| 2005/0125142 A1 | 6/2005 | Yamane |
| 2006/0017938 A1 | 1/2006 | Ohtomo et al. |
| 2006/0195254 A1 | 8/2006 | Ladetto et al. |
| 2007/0058046 A1 | 3/2007 | Kagei |
| 2007/0133012 A1 | 6/2007 | Euler |
| 2007/0188601 A1 | 8/2007 | Rohaly et al. |
| 2007/0247457 A1 | 10/2007 | Gustafsson et al. |
| 2007/0297696 A1 | 12/2007 | Hamza et al. |
| 2009/0074254 A1 | 3/2009 | Jamison et al. |
| 2009/0154793 A1 | 6/2009 | Shin et al. |
| 2009/0220144 A1 | 9/2009 | Mein et al. |
| 2009/0225161 A1 | 9/2009 | Otani et al. |
| 2009/0231574 A1 | 9/2009 | Vogel et al. |
| 2009/0262974 A1 | 10/2009 | Lithopolous |
| 2009/0267827 A1 | 10/2009 | Allison |
| 2010/0013927 A1 | 1/2010 | Nixon |
| 2010/0118116 A1 | 5/2010 | Tomasz et al. |
| 2010/0157283 A1 | 6/2010 | Kirk et al. |
| 2010/0168949 A1 | 7/2010 | Malecki et al. |
| 2010/0172546 A1 | 7/2010 | Sharp |
| 2010/0174507 A1 | 7/2010 | Vogel et al. |
| 2010/0215212 A1 | 8/2010 | Flakes, Jr. |
| 2010/0228418 A1 | 9/2010 | Whitlow et al. |
| 2010/0289642 A1 | 11/2010 | Harrison |
| 2010/0305857 A1 | 12/2010 | Byrne et al. |
| 2010/0309311 A1 | 12/2010 | Svanholm |
| 2010/0322482 A1 | 12/2010 | Kochi |
| 2011/0007154 A1 | 1/2011 | Vogel et al. |
| 2011/0064312 A1 | 3/2011 | Janky et al. |
| 2011/0075886 A1 | 3/2011 | Ashjaee et al. |
| 2011/0090337 A1 | 4/2011 | Klomp et al. |
| 2011/0158475 A1 | 6/2011 | Otani et al. |
| 2011/0164108 A1 | 7/2011 | Bates et al. |
| 2011/0282578 A1 | 11/2011 | Miksa et al. |
| 2011/0285587 A1 | 11/2011 | Vollath et al. |
| 2011/0290937 A1 | 12/2011 | Salkeld |
| 2012/0026322 A1 | 2/2012 | Malka et al. |
| 2012/0029732 A1 | 2/2012 | Meyer |
| 2012/0093394 A1 | 4/2012 | Li |
| 2012/0154584 A1 | 6/2012 | Omer et al. |
| 2012/0155747 A1 | 6/2012 | Hwang |
| 2012/0163656 A1 | 6/2012 | Wang et al. |
| 2012/0237083 A1 | 9/2012 | Lange et al. |
| 2012/0274775 A1 | 11/2012 | Reiffel |
| 2012/0314068 A1 | 12/2012 | Schultz |
| 2012/0326923 A1 | 12/2012 | Oehler et al. |
| 2012/0330601 A1 | 12/2012 | Soubra et al. |
| 2013/0021475 A1 | 1/2013 | Canant et al. |
| 2013/0161810 A1 | 6/2013 | Lin et al. |
| 2013/0228645 A1 | 9/2013 | Van Speybroeck et al. |
| 2013/0253822 A1 | 9/2013 | Fortune et al. |
| 2013/0298083 A1 | 11/2013 | Bertoldo et al. |
| 2014/0019179 A1 | 1/2014 | Gosalvez et al. |
| 2014/0081571 A1 | 3/2014 | Briggs et al. |
| 2014/0091481 A1 | 4/2014 | Lin et al. |
| 2014/0156219 A1 | 6/2014 | Soubra et al. |
| 2014/0195150 A1 | 7/2014 | Rios |
| 2014/0200863 A1* | 7/2014 | Kamat ............... G01C 15/00 703/1 |
| 2014/0222246 A1 | 8/2014 | Mohamadi |
| 2014/0277956 A1* | 9/2014 | Morin ............... E02F 3/844 701/50 |
| 2015/0036888 A1 | 2/2015 | Weisenburger |
| 2015/0225923 A1* | 8/2015 | Wallace ............... E02F 3/847 701/50 |
| 2015/0268043 A1 | 9/2015 | McFadden et al. |
| 2015/0276402 A1 | 10/2015 | Grasser et al. |
| 2016/0116280 A1 | 4/2016 | Joyce et al. |
| 2017/0221226 A1 | 8/2017 | Shen et al. |

FOREIGN PATENT DOCUMENTS

| | | |
|---|---|---|
| EP | 391498 | 10/1990 |
| EP | 1944572 | 7/2008 |
| EP | 1936323 | 3/2010 |
| EP | 1931945 | 4/2011 |
| JP | 2014-062387 | 4/2014 |
| JP | 2014062387 A * | 4/2014 |
| WO | WO-1991/019265 | 12/1991 |
| WO | WO-2009/100728 | 8/2009 |
| WO | WO-2009/100773 | 8/2009 |
| WO | WO-2009/100774 | 8/2009 |
| WO | WO-2009/103342 | 8/2009 |
| WO | WO-2009/106141 | 9/2009 |
| WO | WO-2010/080950 | 7/2010 |
| WO | WO-2011/005783 | 1/2011 |
| WO | WO-2011/088509 | 7/2011 |
| WO | WO-2011-093751 A1 | 8/2011 |
| WO | WO-2011/131382 | 10/2011 |
| WO | WO-2012/088413 | 6/2012 |
| WO | WO-2014/055428 | 4/2014 |
| WO | WO-2014/055430 | 4/2014 |
| WO | WO-2014/081535 | 5/2014 |
| WO | WO-2014-138951 | 9/2014 |

(56) References Cited

FOREIGN PATENT DOCUMENTS

| WO | WO-2014/205277 | 12/2014 |
|---|---|---|
| WO | WO-2016/032901 | 3/2016 |

OTHER PUBLICATIONS

Akula, Manu, et al. "Integration of infrastructure based positioning systems and inertial navigation for ubiquitous context-aware engineering applications." Advanced Engineering Informatics 25.4 (2011): 640-655. (Year: 2011).*
Azar, Ehsan Rezazadeh, Chen Feng, and Vineet R. Kamat. "Feasibility of in-plane articulation monitoring of excavator arm using planar marker tracking." Journal of Information Technology in Construction (ITcon) 20.15 (2015): 213-229. (Year: 2015).*
Lundeen, Kurt M., et al. "Optical marker-based end effector pose estimation for articulated excavators." Automation in Construction 65 (2016): 51-64. (Year: 2016).*
U.S. Appl. No. 14/958,534; NonFinal Office Action, dated Mar. 8, 2018, 46 pages.
U.S. Appl. No. 14/433,330; Notice of Allowance dated Sep. 28, 2018; 20 pages.
U.S. Appl. No. 14/958,534; Final Office Action, dated Sep. 14, 2018, 40 pages.
Communication pursuant to Article94(3) EPC, dated Dec. 12, 2018, 5 pages.
Communication pursuant to Article94-3 EPC, dated Jan. 17, 2019, 6 pages.
Communication pursuant to Article94-3 EPC, dated Jan. 31, 2019, 9 pages.
U.S. Appl. No. 14/958,534; Non-Final Office Action, dated Jan. 11, 2019, 41 pages.
U.S. Appl. No. 13/332,648; NonFinal Office Action dated Dec. 5, 2014; 83 pages.
U.S. Appl. No. 13/332,648; Notice of Allowance dated Jul. 7, 2015; 44 pages.
International Preliminary Report on Patentability (IPRP) prepared by the International Bureau for PCT International Patent Application No. PCT/US11/66839, dated Jul. 4, 2013; 6 pages.
International Search Report and Written Opinion prepared by the U.S. Patent and Trademark Office as International Searching Authority for PCT International Patent Application No. PCT/US11/66839, dated Mar. 12, 2012; 12 pages.
Extended European Search Report for EP-21064568, dated Oct. 17, 2017; 6 pages.
International Preliminary Report on Patentability (IPRP) prepared by the International Bureau for PCT International Patent Application No. PCT/US13/62674, dated Jun. 18, 2015; 10 pages.
International Search Report and Written Opinion prepared by the U.S. Patent and Trademark Office as International Searching Authority for PCT International Patent Application No. PCT/US13/62674, dated Mar. 10, 2014; 18 pages.
U.S. Appl. No. 14/433,330; NonFinal Office Action dated Oct. 5, 2017; 44 pages.
International Preliminary Report on Patentability (IPRP) prepared by the International Bureau for PCT International Patent Application No. PCT/US13/62679; dated Apr. 16, 2015; 8 pages.
International Search Report and Written Opinion prepared by the U.S. Patent and Trademark Office as International Searching Authority for PCT International Patent Application No. PCT/US13/62679, dated Mar. 28, 2014; 16 pages.
NASVIK, "Site Layout with Robotic Total Stations", Dec. 2003 [retrieved on Jan. 25, 2014]. Retrieved from the Internet<URL:http://www.concreteconstruction.net/Images/Site%20Layout%20with%20Robotic%20Total%20Stations_tcm45-590322.pdf> p. 3, paragraph [0000].
Tahar et al. "UAV-Based Stereo Vision for Photogrammetric Survey in Aerial Terrain Mapping," 2011 International Computer Applications and Industrial Electronics (ICCAIE 2011), Dec. 4, 2011, pp. 443-447.
U.S. Appl. No. 13/685,375; NonFinal Office Action dated Aug. 3, 2015; 20 pages.
U.S. Appl. No. 13/685,375; Notice of Allowance dated Sep. 3, 2015; 10 pages.
International Preliminary Report on Patentability (IPRP) prepared by the International Bureau for PCT International Patent Application No. PCT/US13/67115, dated Jun. 4, 2015; 9 pages.
International Search Report and Written Opinion prepared by the European Patent Office as International Searching Authority for PCT International Patent Application No. PCT/US13/67115, dated Jan. 27, 2014, 14 pages.
U.S. Appl. No. 13/922,772; NonFinal Office Action dated May 28, 2015; 37 pages.
U.S. Appl. No. 13/922,772; Notice of Allowance dated Sep. 21, 2015; 20 pages.
International Search Report and Written Opinion prepared by the European Patent Office as International Searching Authority for PCT International Patent Application No. PCT/US14/43271, dated Sep. 22, 2014, 9 pages.
International Preliminary Report on Patentability (IPRP) prepared by the International Bureau for PCT International Patent Application No. PCT/US14/43721, dated Dec. 30, 2015; 6 pages.
Elphel, Inc. (2011) Elphel-Eyesis 4π http://www3.elphel.com/eyesis-4pi, accessed on: Feb. 29, 2012, 4 pages.
Elphel, Inc. (2011) Imaging solutions with Free software and open hardware, www3.elphel.com accessed on Mar. 1, 2012, 2 pages.
Elphel, Inc. (Mar. 10, 2010) Elphel Development Blog first Elphel Eyesis Prototype assembled, www.elphel.com accessed on Mar. 1, 2012, 7 pages.
Elphel, Inc. (Nov. 12, 2011) Elphel-Eyesis 4π Brochure, www.elphel.com accessed on Feb. 29, 2012, 12 pages.
U.S. Appl. No. 14/433,330; Final Office Action dated May 15, 2018; 42 pages.
U.S. Appl. No. 14/958,534; Final Office Action, dated Jun. 19, 2019, 45 pages.
EP Application No. 13789137.0 Communication pursuant to Article94-3 EPC, dated Jun. 27, 2019, 7 pages.
Extended European Search Report for EP-21099510, dated Feb. 4, 2019, 10 pages.

* cited by examiner

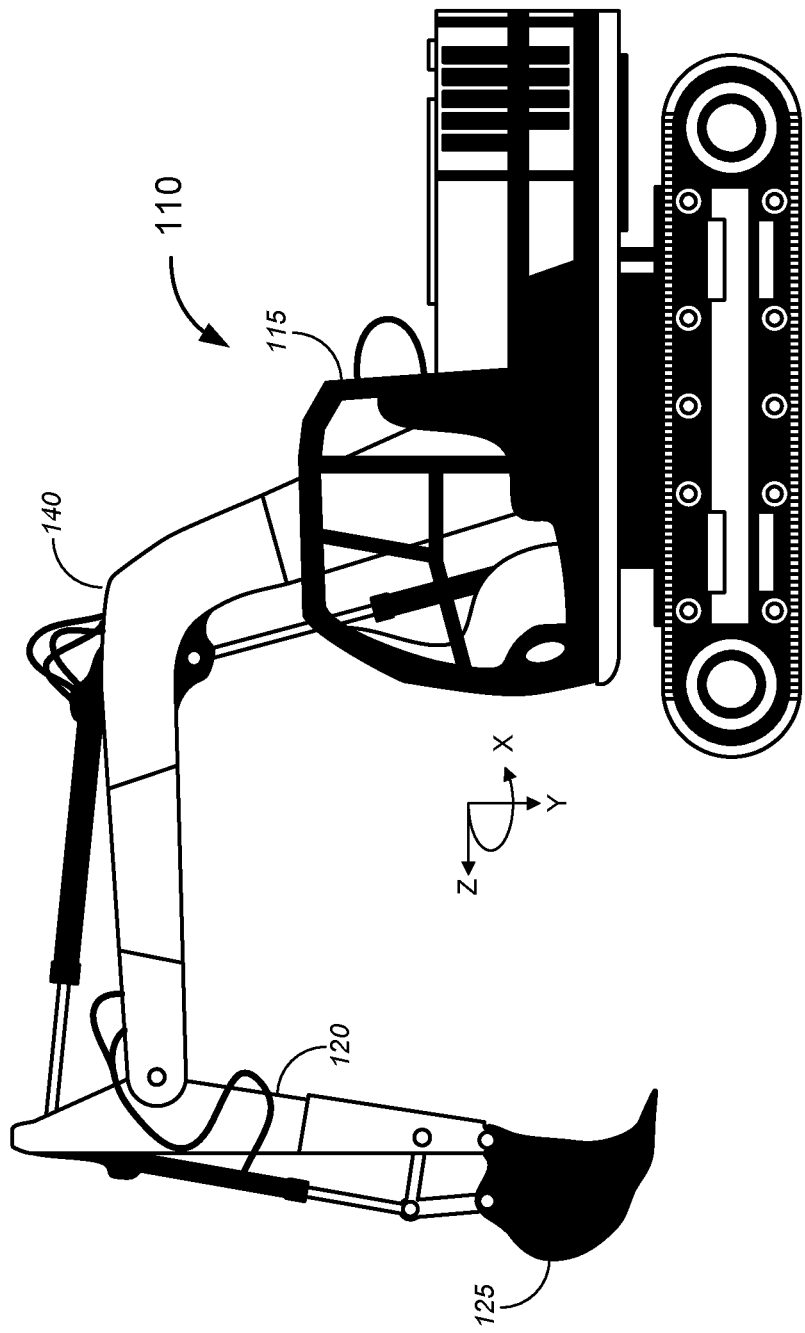

EXCAVATOR BUCKET POSITIONING VIA MOBILE DEVICE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to position and motion tracking, and more particularly, to novel tools and techniques for tracking the position and motion of a stick and/or a bucket of an excavator using a mobile communication device with an image sensor.

BACKGROUND

Excavators are typically used on construction sites and in mining operations for the removal of earth. Because of the excavator's design, it is difficult for an operator of an excavator to determine the orientation and motion of an excavator bucket once the excavator bucket drops below the operator's "horizon" (which might be defined by the bottom of a window of the excavator cabin, by the ground surface, etc.).

Traditionally, two people are required in order to determine the location of the excavator bucket. The first person is the operator of the excavator and controls the excavator and the bucket of the excavator from inside the cabin of the excavator. The second person serves as an observer on the construction site and provides information to the excavator operator inside the cabin about the location and motion of the bucket of the excavator. Without the observer providing information to the operator of the excavator, the operator often is forced to guess at the position of the bucket.

This traditional technique of operating the excavator results in several fundamental inefficiencies. First, if an observer is used, those man hours are essentially wasted for the construction team. Moreover, miscommunication can often occur between the operator of the excavator and the observer on the construction site. This miscommunication can result in the operator of the excavator incorrectly positioning the bucket of the excavator and multiple attempts to correctly position the bucket of the excavator.

Accordingly, there is a need for a motion and position tracking system, which can be used, inter alia, in tracking the position and motion of a stick and a bucket of an excavator.

BRIEF SUMMARY

Various embodiments provide improved techniques for position and/or motion tracking, including without limitation solutions that can be used for excavation and similar applications. In a particular aspect of some embodiments, a communication device with an image sensor may be provided to track the orientation and/or motion of a stick of an excavator and/or reference features located on a stick of an excavator. A location of a bucket of an excavator may then be calculated with respect to the stick or reference features on the stick of the excavator. Thus, an operator in the cabin of the excavator can use the communication device to effectively and efficiently track the location of the excavator bucket without the need for a second person to provide instructions about the orientation and motion of the bucket.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, solid state storage, magnetic media, and/or the like).

Merely by way of example, a system in accordance with one set of embodiments might comprise a mobile communication device or any other apparatus comprising an image sensor, an accelerometer, a gyroscope, a display, and one or more processors in communication with the image sensor, accelerometer, gyroscope, and display, and/or a computer readable medium in communication with the processor. The computer readable medium might have encoded thereon a set of instructions executable by the mobile device to capture, with the image sensor, a reference image of at least one reference feature on a stick of an excavator while the stick of the excavator is in an initial reference orientation.

The reference features may be one or more designated optical targets mounted on the stick of the excavator, one or more structures on the stick of the excavator, and/or or the stick of the excavator itself. Further, the mobile communication device may be configured to automatically identify, without human input, the reference features in the reference image.

The mobile communication device may also capture input from the accelerometer of the mobile communication device to determine an orientation of the mobile communication device relative to the ground. Once the reference image of the one or more reference features and the input from the accelerometer is captured, the mobile communication device may be calibrated based on the orientations of the reference features in the reference image and based on the orientation of the mobile communication device. Alternatively and/or additionally, the communication device may comprise a gyroscope. The gyroscope may be communicatively coupled to the communication device and allow the communication device to determine an orientation of the mobile communication device relative to an initial reference (e.g., the ground, the floor of the excavator cabin, the excavator stick, the excavator bucket, etc.). The communication device may further determine, based on data received from the accelerometer and/or gyroscope, whether the orientation of the communication device has shifted as the excavator traverses the work site and take into account the shifts in orientation when calculating the position of the excavator, excavator stick, and/or excavator bucket.

After the mobile communication device is calibrated, the image sensor may capture at least one additional image of the at least one reference feature on the stick of the excavator. The at least one reference feature of the additional image may be the same at least one reference feature that was detected in the reference image or a different at least one reference feature. If the image sensor captures a different at least one reference feature, the different at least one reference feature's orientation may be known relative to the at least one reference feature captured in the reference image. The mobile communication device may then be configured to determine, from the orientations of the at least one reference feature in the additional image, an additional orientation of the stick of the excavator. Once the additional orientation of the stick of the excavator is determined, the additional orientation of the stick of the excavator may be displayed to the excavator operator and/or user of the communication device.

The orientation of the stick may comprise a reach, a depth, and/or an azimuth relative to a known point and/or relative to a local or global coordinate system. Then, at least one additional orientation of the stick may be determined by comparing the additional image of the orientation of the stick of the excavator relative to the reference orientation of the stick of the excavator from the reference image. Additionally, at least one additional orientation of the stick may be determined by comparing orientations of the one or more reference features in the additional image with orientations of the one or more reference features in the reference image. The orientations of the reference features may comprise at least one of positions of the one or more reference features on the stick of the excavator and/or attitudes of the one or more reference features.

In an embodiment, once the orientation of the stick of the excavator is determined, the orientation of the bucket of the excavator may be determined relative to the stick of the excavator. The orientation of the bucket of the excavator may be displayed to the operator of the excavator after the orientation of the bucket is determined. Determining the orientation of the bucket may comprise determining a reach, depth, and/or an azimuth relative to a local or global coordinate system.

An azimuth of the stick of the excavator, an estimation error for the reference images, and/or an estimation error for the accelerometer/gyroscope input may also be calculated by the communication device.

Another aspect according to certain embodiments provides an apparatus comprising a non-transitory computer readable medium having encoded thereon a set of instructions executable by a mobile communication device to capture, with the image sensor of a mobile communication device, a reference image of a plurality of reference features on a stick of an excavator while the stick of the excavator is in an initial reference position. Next, the apparatus may be configured to capture input from an accelerometer/gyroscope of the mobile communication device to determine an orientation of the mobile communication device. Determining the orientation of the mobile communication device may include determining a tilt angle of the mobile communication device with respect to the ground. Based on the orientations of the plurality of reference features in the reference image and the orientation of the mobile communication device, the mobile communication device may be calibrated.

A second image of the plurality of the reference features may then be captured with the image sensor of the mobile communication device. The set of instructions may then determine, from orientations of the plurality of reference features in the second image, a second orientation of the stick of the excavator and display, with a display of the mobile communication device, an indication of the determined second orientation of the stick of the excavator.

A method in accordance with another set of embodiments might comprise capturing, with an image sensor of a mobile communication device, a reference image of a plurality of reference features on a stick of an excavator while the stick of the excavator is at a known orientation. The method may further include capturing input from an accelerometer/gyroscope of the mobile communication device and determining an orientation of the mobile communication device, based on the input from the accelerometer/gyroscope of the mobile communication device. Based on orientations of the plurality of reference features in the reference image and the orientation of the mobile communication device, the mobile device may then be calibrated.

The method may also comprise capturing, with the image sensor of the mobile communication device, a second image of the plurality of reference features on the stick of the excavator. The method may further comprise determining, from orientations of the plurality of reference features in the second image, a second orientation of the stick of the excavator and displaying, with a display of the mobile communication device, an indication of the determined second orientation of the stick of the excavator.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 3A-3C illustrate schematic block diagrams of an excavator with the excavator stick and excavator bucket in several different orientations, in accordance with various embodiments.

DETAILED DESCRIPTION OF CERTAIN EMBODIMENTS

Figure 1:
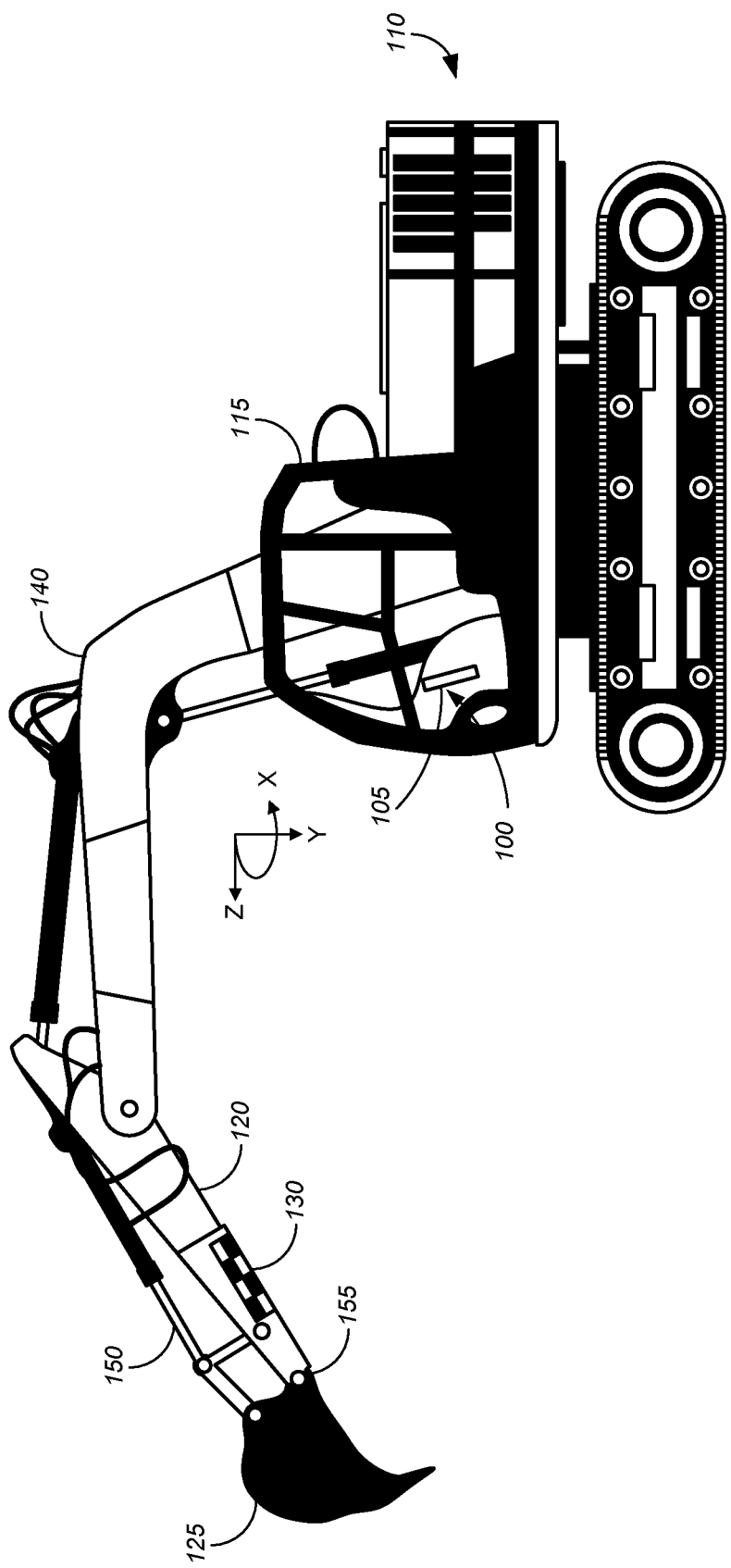
FIG. 1 is a schematic block diagram of an excavator with a position and motion tracking system, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide novel solutions and techniques for position and/or motion tracking, including without limitation solutions that can be used for excavation and similar applications. In the field of excavation, it is difficult for the operator of an excavator to track the bucket of the excavator once the excavator bucket drops below the window of the excavator cabin and/or below a surface of the ground. Thus, a second person is needed to provide information to the excavator operator about the orientation and motion of the excavator bucket. Certain embodiments provide enhanced efficiency, efficacy and/or safety over this conventional technique by providing tools and techniques (including without limitation methods, systems, and/or software) that enable an excavator operator to simply and efficiently track the position and motion of the excavator bucket using a mobile communication device (such as a wireless phone, a tablet computer, and/or the like) without the need for a second person. In order to track the orientation and motion of the excavator bucket, such a communication device with one or more image sensors may be provided to track the stick of the excavator (which remains visible from the window of the excavator cabin). The position and motion of the excavator bucket may then be determined relative to the position and motion of the excavator stick.

For example, FIG. 1 illustrates a position and motion tracking system 100, in this case, a mobile communication device, with a single image sensor (not shown in FIG. 1), in accordance with one set of embodiments. The motion and position tracking system 100 may be used in conjunction with an excavator 110. The excavator 110 may include an excavator cabin 115, an excavator stick 120, an excavator bucket 125, and an excavator boom 140. The position and motion tracking system may be placed in the excavator cabin 115. The excavator 110 may further include an optical target 130 (which can be considered a type of reference feature and may be referred to using this more general term) mounted on the excavator stick 120. It should be noted that while the communication device 100 and excavator 110 of FIG. 1 includes a combination of many different features, mobile communication devices and excavators in accordance with other embodiments might omit some or all of these features. Thus, while the illustrated mobile communication device 100 and excavator 110 is exemplary of certain embodiments, it should not be considered limiting.

In general, the field of position and motion tracking is concerned with determining the position and motion, generally (although not always) in three dimensions, of a "reference feature," (also referred to as an "object point," "target point," or a "point of interest") which can be any point in space, at a point in time and/or over time. Often (but again, not always), a reference feature may correspond to an "object of interest," which, in this example, might be the excavator stick 120 or bucket 125, a boundary of the excavator stick 120 or bucket 125, or a given point on the stick 120 and/or bucket 125. In the non-limiting examples provided in this specification, the position and motion tracking system 100 is concerned with tracking the position and motion of the excavator stick 120, bucket 125, and/or target objects located on the excavator stick 120.

In some cases, a target object might be an optical target 130 that is placed on the stick 120 or bucket 125 of the excavator 110. Examples of optical targets, some of which are well known, are prisms, discs, spheres, flags, and/or the like, which can be placed in a known position relative to a target point and may be designed to be relatively easy to acquire (e.g., visually and/or electronically) for position measurement purposes. The optical targets or other reference features may be placed in a readily identifiable pattern such as a checkerboard, a blob, and/or the like. Additionally and/or alternatively, the target object may be the stick 120, bucket 125, and/or a boundary of the stick 120 and/or bucket 125. Based on the measurement of the position of the target object and the known position of the target object relative to the target point, the position of the target point can be calculated, often automatically in software. Position and motion tracking system 100, in accordance with various embodiments, can include image sensor 105 (also referred to as camera 105) to detect (and/or collect data about the position and motion of) reference features and/or target objects.

Figure 2:
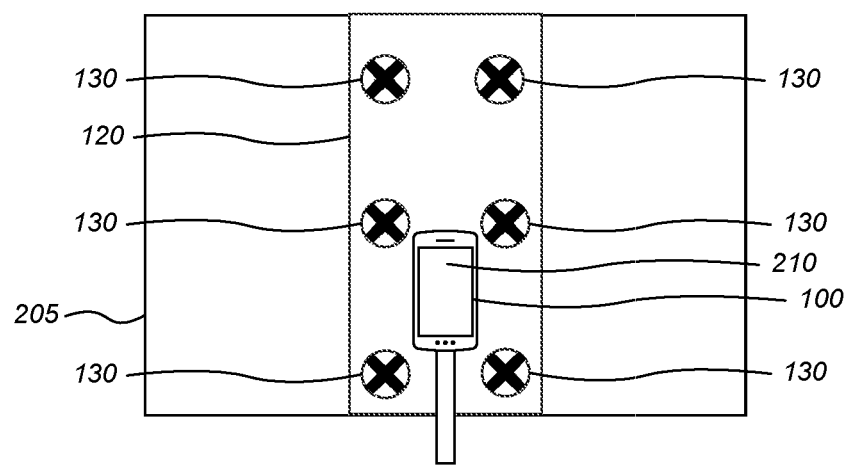
FIG. 2 is a schematic block diagram of a view from inside the excavator cabin, in accordance with various embodiments.

FIG. 2 illustrates an exemplary view from inside the excavator cabin 115. The communication device 100 may be mounted or otherwise placed inside the excavator cabin 115. In an aspect of some embodiments, the communication device 100 can be a mobile communication device, which can include at least one of a computer, laptop, tablet, wireless phone, smart phone, and/or the like. The communication device 100 may have a display 210 that presents the view from an image sensor (which might be, for example, a camera on a mobile phone, which is not shown in FIG. 2) to the user of the communication device 100.

Communication device 100 may be placed in the excavator cabin 115 so that the image sensor of the communication device 100 has a field of view out the cabin window 205 of the excavator stick 120; and the display 210 of the communication device 100 faces toward the operator of the excavator. The communication device 100 may contain one or more image sensors. The image sensor may be rigidly or removably coupled to the communication device 100. The image sensor may also be separate from the communication device 100 and communicate with the communication device wirelessly. An example of an image sensor in accordance with a set of embodiments might be an onboard camera on a wireless phone, smart phone, tablet computer, laptop computer, and/or the like.

In particular embodiments, the communication device may be placed anywhere in the excavator cabin 115 where the image sensor of the communication device 100 has a clear line of sight to the stick 120 of the excavator 110. For example, the communication device 100 may be mounted on the cabin window 205, ceiling, or floor of the excavator cabin 115. The communication device 100 may be adjusted until the excavator stick 120 and the one or more reference features 130 appear in the field of view of the image sensor. This may be done by displaying the images received by the image sensor to the excavator operator on the display 210 of the communication device 100. This adjustment can either be done by adjusting the communication device 100 itself or by mounting the communication device 100 in a different location in the excavator cabin 115. Further, the communication device 100 may be placed in a substantially vertical orientation in the excavator cabin 115 in order to capture as much of the excavator stick 120 as possible in the field of view of the image sensor of the communication device 100.

Further, as shown in FIG. 2, often the excavator bucket is not visible from the excavator window 205. Therefore, the location and position of the excavator bucket may be determined relative to the location of the excavator stick 120 or the one or more reference features located on the excavator stick.

Figure 3B:
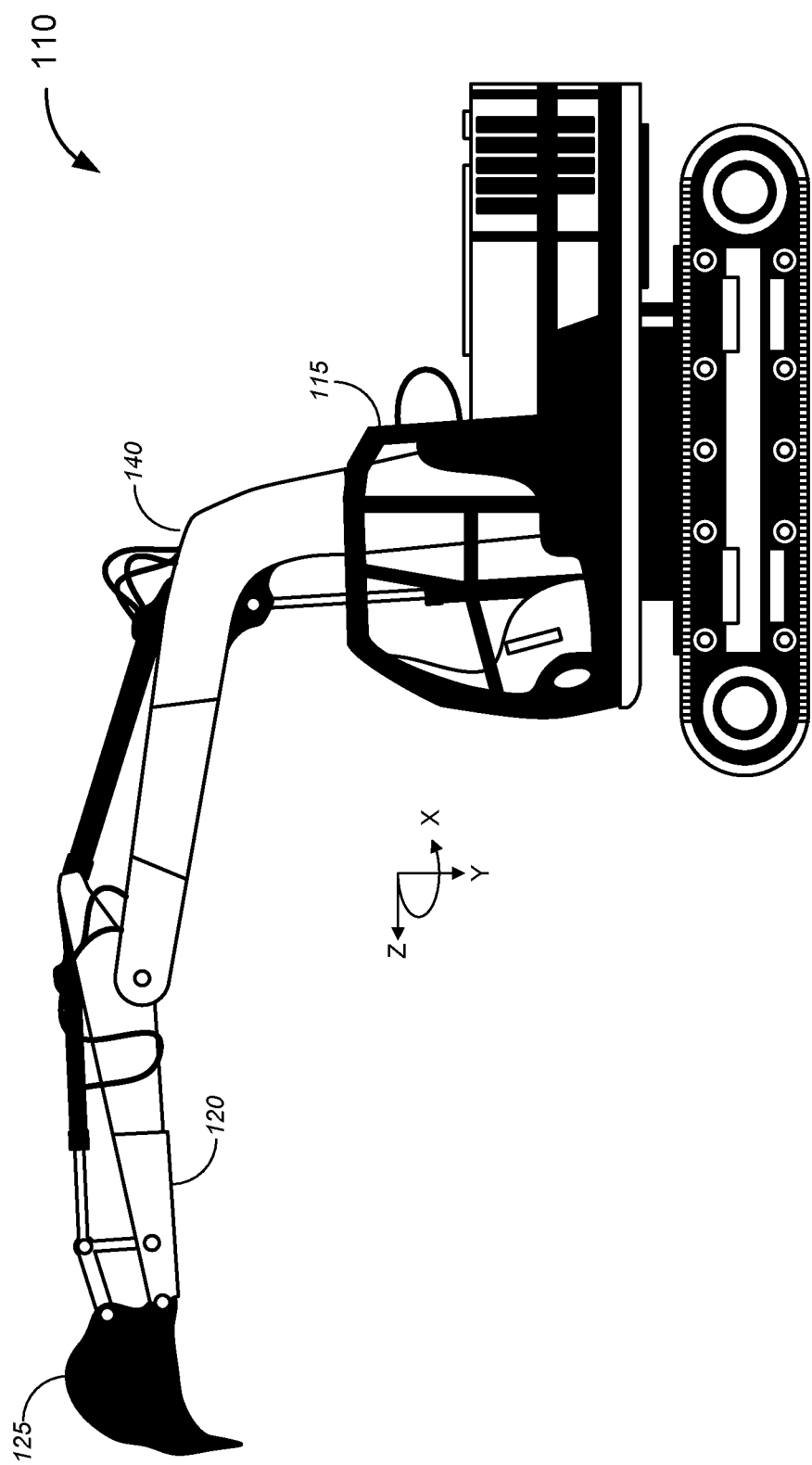
Figure 3C:
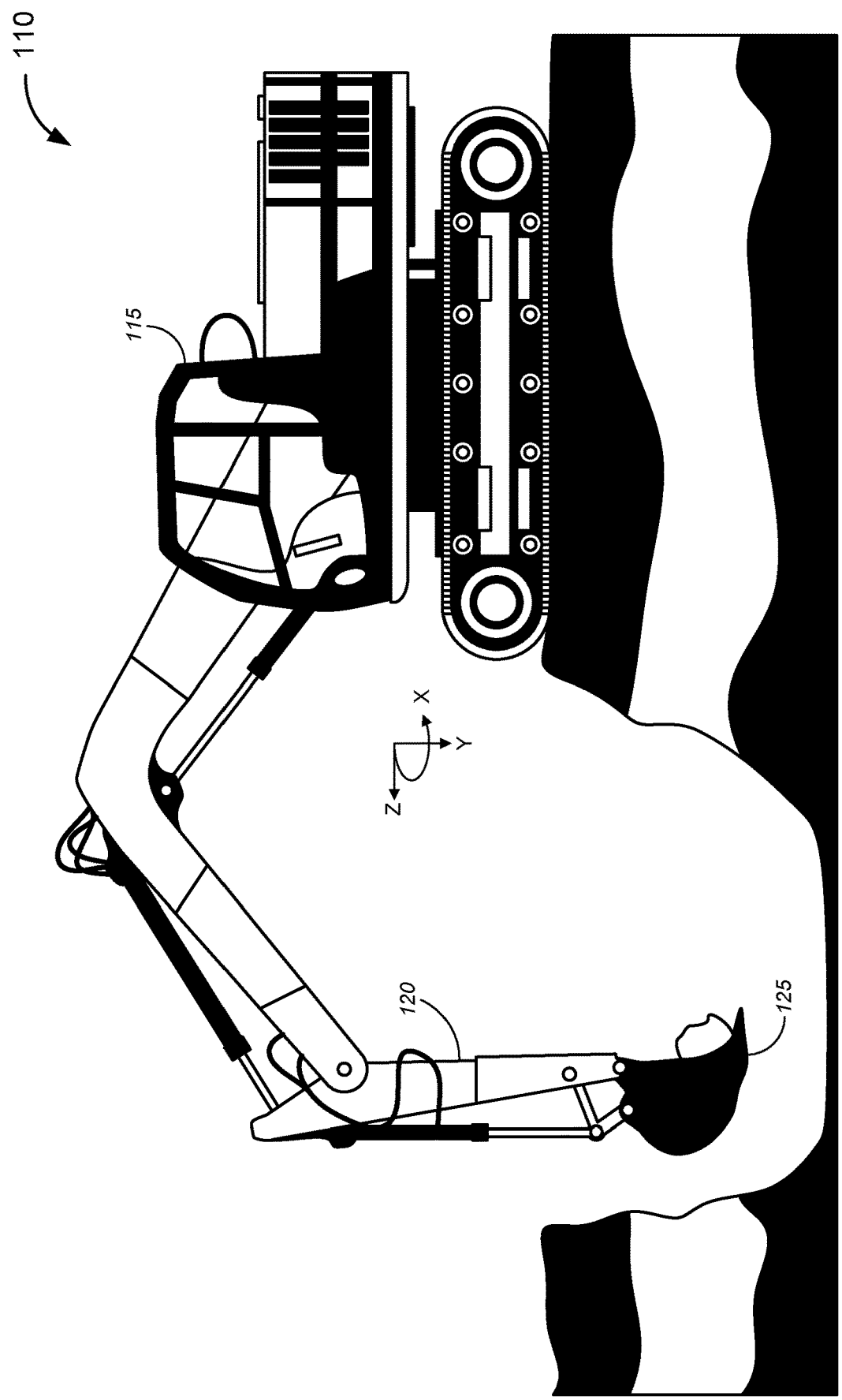

By way of illustration, FIGS. 3A-3C depict the excavator 110 of FIG. 1, in three different orientations, and they illustrate how the position and motion of the excavator bucket 125 may be tracked relative to the stick 120 of the excavator 110. In one embodiment, the excavator stick 120 and/or bucket's 125 positioning and movement might comprise two dimensions that need to be tracked. In an aspect, these dimensions originate from a known orientation of one or more reference points or features on the stick 120 and/or the bucket 125, and are measured from the center of the image sensor 105 inside the cabin 115 of the excavator 110 (as shown by (X, Y, Z) axis, which are defined relative to the field of view of the image sensor 105). The two dimensions in which position changes can be measured directly from the optical target on the stick 120 are: (1) range or reach position/movement (along the Z-axis) and (2) vertical or depth position/movement (along the Y-axis). Range or reach movement occurs when the excavator stick 120 and bucket 125 move closer to or further from the image sensor 105 in the cabin 115 of the excavator 110. Vertical or depth movement occurs when the stick 120 and bucket 125 move up or down with respect to the image sensor 105 in the cabin 115 of the excavator 110.

Although the excavator stick 120 and bucket 125 may move in the third dimension (along the X-axis), such motion normally is performed by rotation of the cabin 115. The motion of the stick 120 and bucket 125 are relatively static along the X-axis (cross-radial direction) of the field of view of the image sensor 105, since the system 100 rotates along with the cabin 115, stick 120, and bucket 125. Thus, in many cases, there is no apparent movement of the stick 120 and bucket 125 along the X-axis relative to the field of view of the image sensor 105, and movement along that axis, therefore, can be neglected. (It should be noted, however, that this azimuth/cross-radial movement of the stick 120 and/or bucket 125 about the cabin 115 (i.e., apparent movement along the X-axis in the field of view of the image sensor 105) can be tracked by other techniques according to some embodiments, for example, as discussed below with regard to FIGS. 4A and 4B.)

In addition to determining the reach position (along the Z-axis) and vertical position (along the Y-axis) of the bucket 125, the rotary orientation of the bucket 125 may also be determined using the above system. This may be done by attaching a rotary sensor that determines the orientation of the bucket to the T-bone connector 155 of the excavator 110 or pivot of the bucket 125. The rotary sensor may then be communicatively coupled to the communication device 100 to send a rotary orientation of the bucket 125 to the communication device 100. The rotary orientation of the bucket 125 may then be displayed to an operator of the excavator 110 on the communication device 100.

Additionally and/or alternatively, a remote image sensor located outside of the cabin 115 of the excavator 110 may be used. The image sensor may be mounted on the outside of the excavator cabin on the excavator itself. The remote image sensor may also be mounted on a device (e.g., a motorized remote control cart) that is separate from the excavator and that moves relative to the excavator 110 as the excavator 110 traverses a work site. The remote image sensor may be communicatively coupled to the communication device 100 to send images of the one or more reference features to the communication device 100. The communication device 100 may use the images from the remote image sensor to determine an orientation of the excavator stick 120 and/or an orientation (including the rotary orientation) of the bucket 125.

In accordance with some embodiments, any detectable features of the stick 120 and/or bucket 125 (including, in particular embodiments, features of optical targets 130 on the stick and/or bucket) can be tracked by the system 100 based on images captured by the image sensor 105. In some cases the reference features and/or optical targets 130 on the stick 120 of the excavator 110 may first be oriented in a known optical pattern. Once these reference features/optical targets 130 are placed in a known pattern, the image sensor 105 of the communication device 100 can capture an image comprising those reference features/optical targets 130 that are in the known pattern.

For example, if the optical targets 130 on the excavator stick 120 are in a known pattern, such as a checkerboard pattern, then the image sensor 105 may be used to capture one or more images of the checkerboard pattern on the excavator stick 120. The communication device 100 may then detect all likely corner candidates (e.g., the corners that are likely to be a part of the checkerboard pattern) of the checkerboard. The unlikely corners (e.g., the corners that are not likely to be a part of the known checkerboard pattern) may be filtered out using the Harris corner detection algorithm. Once all the likely corners have been filtered, the further improved corner locations with sub-pixel accuracy can be calculated using the Förstner corner detector algorithm. A morphological "seed expansion" algorithm may then be used to recover the known checkerboard pattern associated with the sub-pixel corners that were detected with the communication device 100. Similar techniques can be used to detect other patterns. After detecting the checkerboard (or other) pattern and the sub-pixel corner locations in the one or more images, those corners can be compared with the corresponding projective coordinates on the image plane computed from the camera projection model. By minimizing the sum of squared differences from comparison of corner location, the parameters in the camera projection model, including camera intrinsic, lens distortion and camera orientation with respect to targets 130, can be further refined.

Generally, this so-called pinhole camera projection model maps the targets 130 in the world reference frame to the one-to-one correspondences in the camera centered frame by a 6 degrees of freedom ("dof") transform. It consists of a 3 dof translation defined as a 3 by 1 vector t, and a 3 dof rotation represented by a rotation matrix R. For a given target $[X, Y, Z]^T$, the following Eq. 1 transforms its coordinates in the world frame to the corresponding ideal normalized image coordinates [x, y, z] in the camera centered frame, and then to the projective coordinates [u, v] on the image plane up to scale factor s through the camera intrinsic matrix K. Here, the matrix K is an upper triangle matrix consisting the intrinsic parameters of the camera, including the focal length ($f_x$ and $f_y$) which defines as the distance from the camera center to the image plane, and the principal point ($c_x$, $c_y$) which defines as the intersection of the principal axis and the image plane.

$$s \begin{bmatrix} u \\ v \\ 1 \end{bmatrix} = K \begin{bmatrix} x \\ y \\ z \end{bmatrix} = K \left( R \begin{bmatrix} X \\ Y \\ Z \end{bmatrix} + t \right) = \begin{bmatrix} f_x & 0 & c_x \\ 0 & f_y & c_y \\ 0 & 0 & 1 \end{bmatrix} \left( R \begin{bmatrix} X \\ Y \\ Z \end{bmatrix} + t \right) \quad \text{(Eq. 1)}$$

Since the world frame can be chosen arbitrarily, the XY-plane can be aligned with the checkerboard plane, thus all the corners in the checkerboard have all zero Z-coordinates as shown in FIG. 2. Consequently, the projective model in Eq. 1 can be simplified as in Eq. 2, and $r_1$, $r_2$ are the corresponding first two columns in the rotation matrix R. Here, a homography matrix H can be used to represent the mapping between the checkerboard plane and its projective image. Based on the constraints of orthogonal unit vectors $r_1$ and $r_2$, both the camera intrinsic matrix K and the 6 dof extrinsic parameters can be recovered from the homography matrix H. In practice, this recovered result is merely a rough initial guess and should be refined through a maximum likelihood inference. Given a set of checkerboard images and the known pattern of the checkerboard plane and assuming the corresponding image measurements are corrupted by independent and identically distributed noises, the maximum likelihood estimate can be obtained by minimizing the aforementioned sum of squared differences between the target image coordinates and the computed coordinates from the projective transformation. With the help of the Levenberg-Marquardt algorithm, the camera's intrinsic and extrinsic parameters are iteratively optimized.

$$s \begin{bmatrix} u \\ v \\ 1 \end{bmatrix} = \quad \text{(Eq. 2)}$$

$$K \begin{bmatrix} x \\ y \\ z \end{bmatrix} = K \left( [r_1 \ r_2 \ r_3] \begin{bmatrix} X \\ Y \\ 0 \end{bmatrix} + t \right) = k [r_1 \ r_2 \ t] \begin{bmatrix} X \\ Y \\ 1 \end{bmatrix} = H \begin{bmatrix} X \\ Y \\ 1 \end{bmatrix}$$

$$\xrightarrow{\text{Projection Model}} x' = \frac{x}{z}, \text{ and } y' = \frac{y}{z} \xrightarrow{\text{Apply Lens Distion}}$$

$$x'' = x'(1 + k_1 r^2 + k_2 r^4) + 2 p_1 x' y' + p_2 (r^2 + 2 x'^2) \quad \text{(Eq. 2a)}$$

$$y'' = y'(q1 + k_1 r^2 + k_2 r^4) + p_1 (r^2 + 2 y'^2) + 2 p_2 x' y' \quad \text{(Eq. 2b)}$$

where $r^2 = x'^2 + y'^2$ $$u = f_x * x'' + c_x \quad \text{(Eq. 3a)}$$

$$v = f_z * y'' + c_y \quad \text{(Eq. 3b)}$$

Additionally, the lens can introduce some distortions to this ideal camera projective transformation as shown in Eq. 2 and 3. Typically there are two types of distortion effects: the radial distortion represented by coefficients [$k_1$, $k_2$], and the tangential distortion represented by coefficients [$p_1$, $p_2$]. Applying these lens distortion effects to the ideal normalized image coordinates [x, y], the above lens distortion model in Eq. 2a and 2b can be obtained. Finally, the distorted normalized image coordinates can be converted to the image points as shown in Eq. 3a and 3b through the camera intrinsic parameters. Since the lens distortion effect are expected to be small, one can assume an initial guess of all zeros and refine these lens distortion parameters based on the maximum likelihood inference as described above. Once the lens distortion parameters are optimized, they are expected to be fixed and can be used throughout the application to remove the distortion effects in each image. Along with the projection technique of a planar target (or others), the position of the stick can be identified throughout various embodiments.

In some embodiments, the communication device 100 may first be calibrated to track the position and motion of the stick 120 of the excavator 110. In order to calibrate the communication device 100, the communication device 100 may determine the orientation of the image sensor 105 to the ground and the excavator stick 120 and/or reference features 130 may be placed in an initial reference position (e.g., where the position of a feature of interest (such as the tip of one of the teeth on the bucket, an optical target on the stick, etc.) is sitting at ground level (or a known height above ground level), at a known distance from the mobile device, cabin, or the like), or where such a feature of interest is at a known position relative to a local or global coordinate scale). The initial reference position may also include a known rotary position of the excavator bucket 125.

In order to determine the orientation of the camera 105 to the ground, the communication device 100 with the camera 105 may be oriented substantially vertical in the excavator cabin 115. However, although the communication device 100 is oriented substantially vertical, the orientation of the communication device 100 often will exhibit a small tilt angle from vertical (and/or, correspondingly, the field of view of the image sensor 105 might have a small tilt angle from the horizontal, in a typical mobile device where the field of view of the sensor 105 is orthogonal to a surface of the mobile communication device to the ground) and this small angle of tilt can cause systematic error in the calculated orientations of the reference features/optical targets 130. This systematic error may be compensated for by obtaining a reading from the accelerometer of the mobile communication device to determine the angle of tilt of the image sensor 105 to the ground. The tilt angle may then be applied to correct the orientation of the calculated reference points 130 captured in the image taken by the camera.

The next step to calibrate the communication device may be to orient the stick 120 and reference features (such as the optical targets 130 and/or various points/portions thereof) in a known position (for example, at a known point, or at a known height/depth Above Ground Level ("AGL") and a known distance from the cabin). Once the stick 120 and optical targets 130 are placed in a known position, the camera 105 of the communication device 100 may be used to detect the excavator stick 120 and optical targets 130 that are in the known position. The image sensor 105 may then capture a reference image of the one or more reference features and the communication device 100 may automatically detect the reference features in the reference image.

Once the orientation of camera 105 of the communication device 100 is obtained, the communication device 100 is calibrated based on the communication device being in a known orientation and the excavator stick 120 being in a known position. The camera 105 of the communication device 100 may then be used to obtain additional images of the excavator stick 120 and reference features 130, as the excavator stick 120 and reference features 130 move and change position. The camera projection model of the oriented camera (as described above) may then be used to determine where the stick 120 of the excavator 110 is with reference to the center of the image sensor 105. Once the communication device determines the location of the excavator stick 120 relative to the center of the image sensor 105, the communication device may calculate the location of the bucket 125 relative to the stick 120 and display the location of the excavator stick 120 and/or and bucket 125 (and/or portions thereof, such as the bottom of the bucket) to the excavator operator on the communication device. This process can be repeated with successive images of the stick, in order to determine how the orientation of the stick has changed from image to image.

The position and motion tracking tools and techniques provided in accordance with various embodiments, therefore, can be used to greatly enhance the efficiency of position and motion tracking tasks. For example, the various embodiments provide a position and motion detection device 100 that is relatively easy to transport, set up, calibrate, and/or use. Further, the position and motion tracking device 100 provides significant additional functionality, especially because the various embodiments can remove operator induced error and uncertainties. For example, by using the position and motion tracking device 100 with the image sensor 105, certain embodiments can provide a more accurate estimate of the stick/bucket position than an unaided operator's estimate. For example, using the position and motion tracking device 100 the estimate was within a precision of five centimeters in the reach (Z) direction and two centimeters in the depth (Y) direction for the orientation of the excavator stick 120 and excavator bucket 125 in various embodiments. The accuracy of the position and motion tracking system can further be improved in both the depth and reach directions by bundle adjustment integration of multiple adjacent frames as a whole. Further, the calculations can be done in real time or near real time such that an operator can correct any errors in real time based on feedback about the position of the stick 120 and/or bucket 125.

In addition to this enhanced efficiency and functionality, position and motion tracking tools, including mobile communication devices, can be used, in accordance with certain embodiments, with substantially less expense than a conventional two person excavation operation, which renders the widespread use of the position and motion tracking tools more economically feasible.

FIGS. 3A-3C illustrate schematic block diagrams of an excavator 110 with the excavator stick 120 and excavator bucket 125 in several different orientations, in accordance with various embodiments. The excavator stick 120 and bucket 125 can move in three dimensions (X, Y, Z), which originate from the center of the image sensor on the device inside the cabin 115 of the excavator 110 and are oriented according to the sensor's field of view (shown by the (X, Y, Z) axis). However, in some cases (such as when only the depth and reach of the bucket relative to the cabin are a concern, rather than a position of the bucket relative to a coordinate system), only two dimensions need to be tracked by the communication device. The two dimensions that need to be taken into account are: (1) range or reach movement (along the Z-axis) and (2) vertical or depth movement (along the Y-axis). Range or reach movement occurs when the excavator stick 120 and bucket 125 move in and out (closer and further away, respectively) with respect to the cabin 115 of the excavator 110. Vertical or depth movement occurs when the stick 120 and bucket 125 move up and down with respect to the camera 105 in the cabin 115 of the excavator 110 (or with respect to the ground surface). Although the excavator stick 120 and bucket 125 do move in the third dimension (along the X-axis in the image sensor's field of view, or in actuality, in an azimuthal direction about the cabin 115), the cross-radial (or X-axis) movement may not be a concern in many operations once the cabin is oriented toward the hole to be dug and can be neglected in some embodiments.

As shown in FIG. 3A, the excavator stick 120 and bucket 125 may be placed in a known orientation to calibrate the communication device 100. In the known position, the distance z and height y from the center of the camera to the reference points on the stick 120 of the excavator 110 is known or calculable. The known orientation may be roughly determined by decomposition of the homography matrix between the known planar targets 130 and the corresponding undistorted image coordinate measurements free of lens distortion effect. And this orientation can be refined using maximum likelihood inference by minimizing the sum of squared differences between detected targets in the image and corresponding projections from the camera projective transformation. The known orientation may also be determined using a total station, by placing the excavator stick 120 at a known position relative to the cabin of the excavator, or by placing the excavator stick 120 at a known position relative to a known point or object. Merely by way of example, an operator might orient the stick 120 so that the bucket 125 sits on the ground at a measured (or otherwise known) position from the cabin.

As shown in FIGS. 3B and 3C, the image sensor of the communication device may track the orientation of the excavator stick 120 through a variety of positions, so long as the stick 120 and/or the one or more reference features remain within the field of view of the image sensor. The image sensor may track the stick 120 as the stick 120 moves in and out and up and down with respect to the cabin 115 (and, more precisely, the image sensor of the communication device mounted within the cabin 115. Since the bucket 125 can have a known orientation relative the stick 120, the position of the bucket 125 can be derived from the determined position of the stick, even when the excavator bucket 125 is not visible from the cabin 115 based on the determined orientation of the stick 120.

Figure 4A:
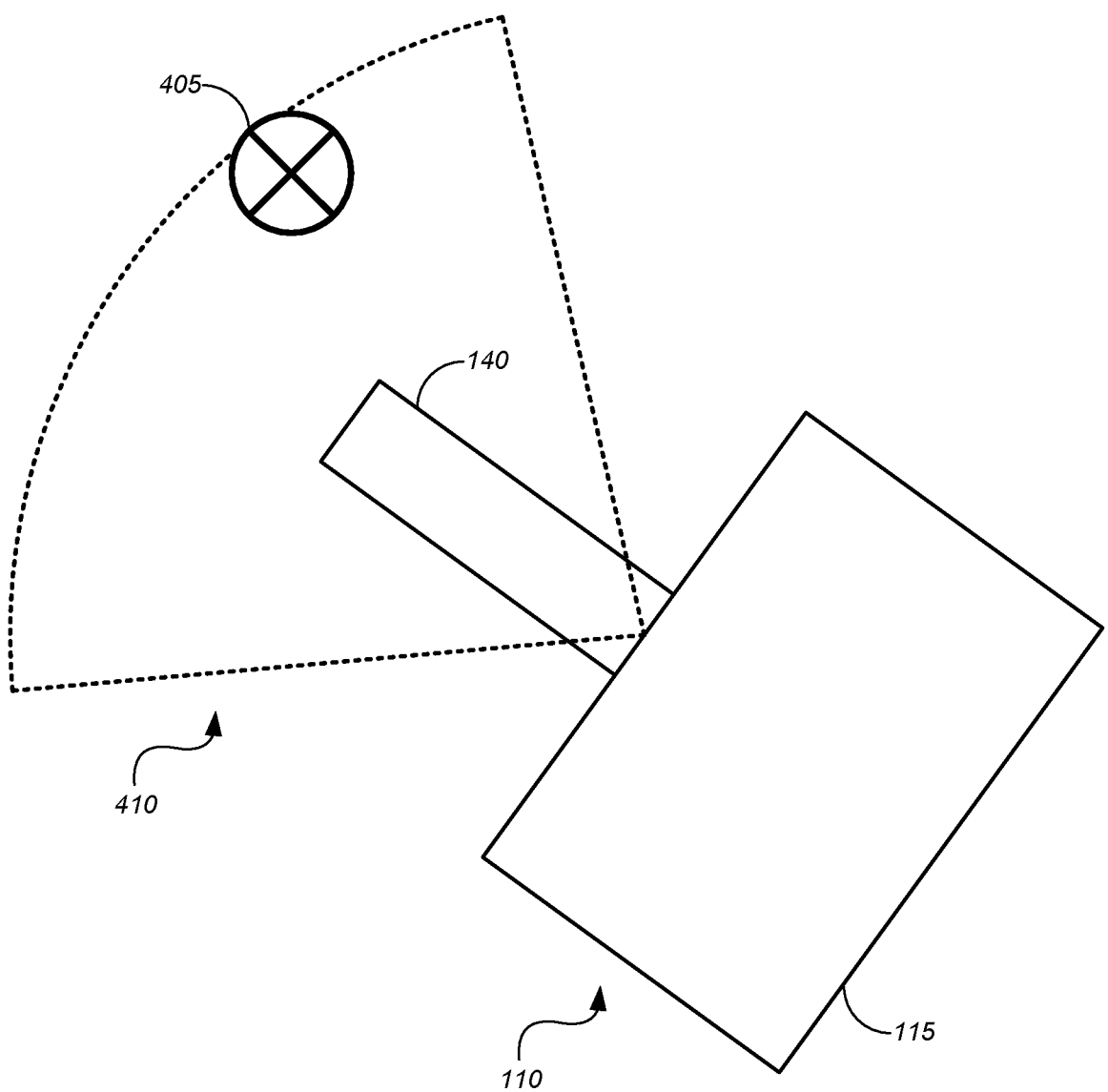
FIGS. 4A and 4B illustrate schematic block diagrams of a top view of an excavator and excavator boom with a panoramic field of view of the image sensor of the communication device, in accordance with various embodiments.
Figure 4B:
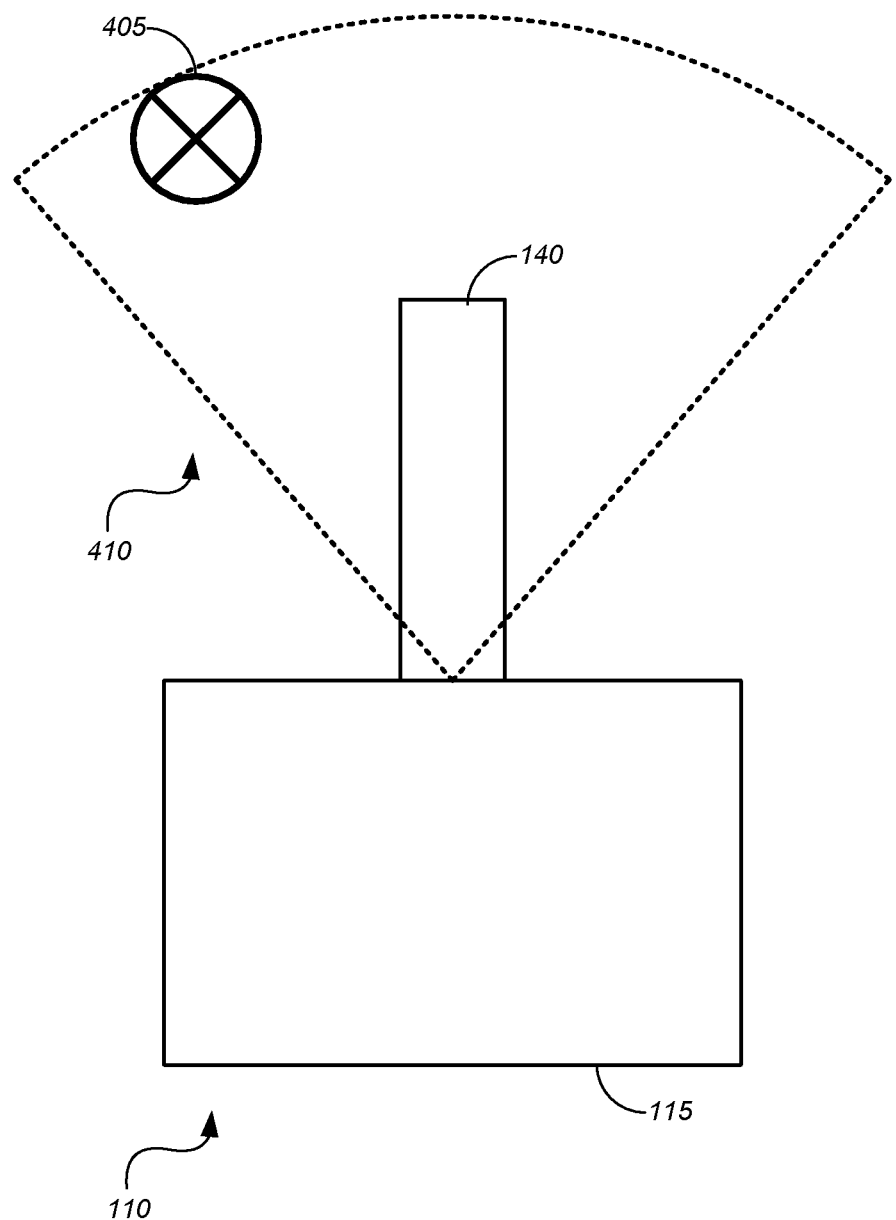

In other embodiments, it may be useful to track the position of the stick and/or bucket not merely in terms of reach and depth, but also in terms of rotation along the axis supporting the cabin. Orientation in these three dimensions might be determined relative to a starting point (as described above in the two dimensional example) and/or with respect to a local or global coordinate system. FIGS. 4A and 4B illustrates a schematic block diagram of a top view of an excavator 110 with a cabin 115 and a boom 140. The cabin 115 might have a communication device (with an image sensor, shown in FIG. 1) mounted within the cabin, and the image sensor might have a panoramic field of view 410, in accordance with various embodiments. In addition to (or alternative to) determining the orientation in terms of depth and reach (as described above, for example), the system might be configured to determine the rotation along the axis supporting the cabin, in terms of azimuth, of the excavator 110, excavator boom 140, excavator stick 120, and excavator bucket 125. The skilled reader will understand that the reach dimension, combined with the azimuth dimension will provide an orientation vector from the orientation of the image sensor in the cabin 115, and if the orientation of the image sensor is known relative to a coordinate system, the orientation of the image sensor can be used to derive the orientation of the stick and/or bucket relative to that same coordinate system.

There are a number of ways to determine the azimuth of the boom 140 (i.e., an azimuth from the image sensor to the stick, assuming the line between the image sensor and the stick 120 is coplanar with the boom 140). In one embodiment, for example, an internal compass and/or gyroscope of the mobile device might be used to determine the azimuth. In other cases, image processing could be used to determine the azimuth (either relative to the known orientation or relative to a coordinate system). Merely by way of example, the azimuth of the boom 140 (or the azimuth to the stick) may be determined by reference to one or more external reference features 405 (i.e. a known dimensioned target, or even a stationary piece of equipment, fence post, natural feature, or other stationary feature, or even a stationary portion of the excavator itself, such as a tread) on a construction site. An optical target may be placed on the one or more external reference features 405 to aid the communication device in identifying the external reference feature 405 or the reference features 405 themselves may be detected by the communication device. The external reference feature 405 may remain in fixed and known location as the cabin 115 (and thus the boom 140) rotates.

The image sensor of the communication device may capture at least two images of the at least one external reference feature 405 while the cabin 115 of the excavator 110 rotates from at least a first orientation (shown in FIG. 4A) to a second orientation (shown in FIG. 4B); the field of view 410 of the image sensor rotates with the cabin 115 (since the communication device is mounted in the cabin), and the position of the reference feature 405 in the field of view 410 changes correspondingly. The at least first and second images of the external references 405 may then be compared to determine the azimuth of the excavator stick (not shown) in the second position, using similar calibration and movement algorithms to those described above with regard to reach and depth.

A gyroscope may further be used to determine a rotation angle from a first position where an image is captured to a second position where an image is captured. The rotation angle may be calculated from gyroscope readings over this interval of movement (i.e., movement from the first position to the second position).

By using the communication device 100 to determine a position (including height, reach, and azimuth position) of an excavator stick 120 and excavator bucket 125, an excavator 110 may be automatically controlled by the communication device 100. The communication system 100 may be communicatively coupled to the hydraulics of the excavator 110. This coupling may be provided by either a wired (e.g., cable) or wireless (e.g., Bluetooth or Wi-Fi) connection from the communication device 100 to a control box. The control box would connect to the hydraulic system (e.g., pump, motor, valve etc.) of the excavator 110 and control the excavator stick 120 and excavator bucket 125. The excavator 110 may be operated automatically via the communication device 110 and the control box and the communication device 110 may correct what the excavator stick 120 and excavator bucket 125 are doing in real time based on a determined position (including height, reach, and azimuth) of the excavator stick 120 and the excavator bucket 120.

Figure 5:
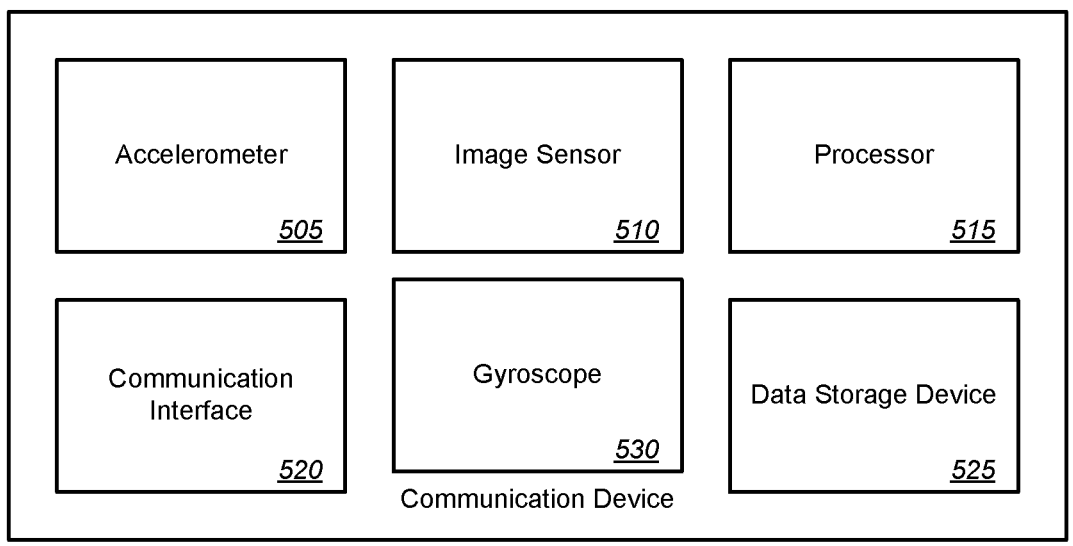
FIG. 5 is a functional block diagram illustrating a position and motion tracking subsystem for a communication device, in accordance with various embodiments.
Figure 5:

FIG. 5 is a functional block diagram illustrating various components of an exemplary communication device 100, in accordance with various embodiments. The various components of the communication device 100 of FIG. 1 may be incorporated within a single housing that encloses the entirety of the communication device 100; alternatively, the communication device 100 might comprise a plurality of components divided between two or more discrete housings. Similarly, certain structural components of the communication device 100 may be relatively more integrated and/or separated. Thus, the sensing subsystem 100 depicted by FIG. 5 should be considered a set of functional components, which may or may not correspond to individual structures. Moreover, while certain functional components of an exemplary communication device 100 are illustrated by FIG. 5, the communication device 100 might have one or more components of a general purpose computer system, as described below with respect to FIG. 6.

As illustrated by FIG. 5, the communication device 100 might include an accelerometer 505, which may be used to calibrate the communication device 100, determine changes in orientation of the device 100, etc. The accelerometer 505 may be used as a tilt sensor to determine the tilt angle (e.g. in two dimensions from vertical) of the communication device 100 and image sensor 505 to the ground, which can be used to calibrate the device as described above. Although the communication device 100 may be placed substantially vertical in the cabin of the excavator, it is likely that there is a small tilt angle of the communication device 100 to the ground and this small angle can cause systematic error when calculating the orientation of the stick and/or reference features. In accordance with certain embodiments, the accelerometer 505 of the communication device 100 can be used to determine situations in which the communication device 100 is not in a substantially vertical position when measurements are to be performed. The systematic error may then be corrected by obtaining a reading from the accelerometer 505 of the communication device to determine the angle of tilt of the communication device 100 to the ground. The determined tilt angle may then be applied to correct the position of the measured reference points obtained from the camera image.

Additionally and/or alternatively, communication device 100 may further comprise a gyroscope 530, which may be used to determine changes in orientation of the device 100, etc. With the gyroscope 530, the rotation angle (from a first position where an image is captured to a second position where an image is captured) can be calculated from gyroscope readings over this interval of movement (i.e., movement from the first position to the second position).

The communication device 100 may further comprise an image sensor 510, which may be used to detect the one or more reference features on the stick of the excavator. The image sensor can include a variety of different types of cameras and other equipment, and any such equipment can be used to capture images, so long as those images can be oriented. Merely by way of example, in some cases an image sensor might comprise a plurality of panoramic image sensors. In a set of embodiments, the image sensor might comprise the onboard camera on the mobile device 100 (e.g., a mobile phone camera, tablet camera, etc.). The image sensor 510 may be used to capture an image of the one or more reference features, as described above, for example, and might be controlled by software stored on a computer readable medium on the device 100 and/or executing on the device 100 to perform the procedures described herein. The rate at which the image sensor captures the images may vary, and might be controlled by the software as well. Merely by way of example, a capture rate of one frame per second, 10 frames per second, 30 frames per second, or any frequency may be used, depending on the desired frequency of measurement and/or the capabilities of the sensor 510 and/or other device hardware, to provide an operator of an excavator with near real-time information about the location and position of the stick and bucket of the excavator.

The communication device 100 may further include a position sensor 515, which might be a global navigation satellite system ("GNSS") sensor, such as a global positioning system ("GPS") sensor or the like. The position sensor 515 can be used to determine a position of the device 100 according to a global or local coordinate system (e.g., latitude/longitude, GPS coordinates, etc.), which can then be used to derive a position of the stick/bucket relative to the same coordinate system (e.g., by performing vector algebra between the position of the device 100 and the position of the stick/bucket relative the device).

The communication device 100 may also have a communication interface 520 and a data storage device 525. The communication interface 520 may enable a user to interact with the position and motion tracking system on the communication device 100. The communication interface 520 is described in further detail with respect to FIG. 7 and user interface 700. Data storage device 525 may be used to store data obtained from the position and motion tracking system on the communication device 100.

Figure 6:
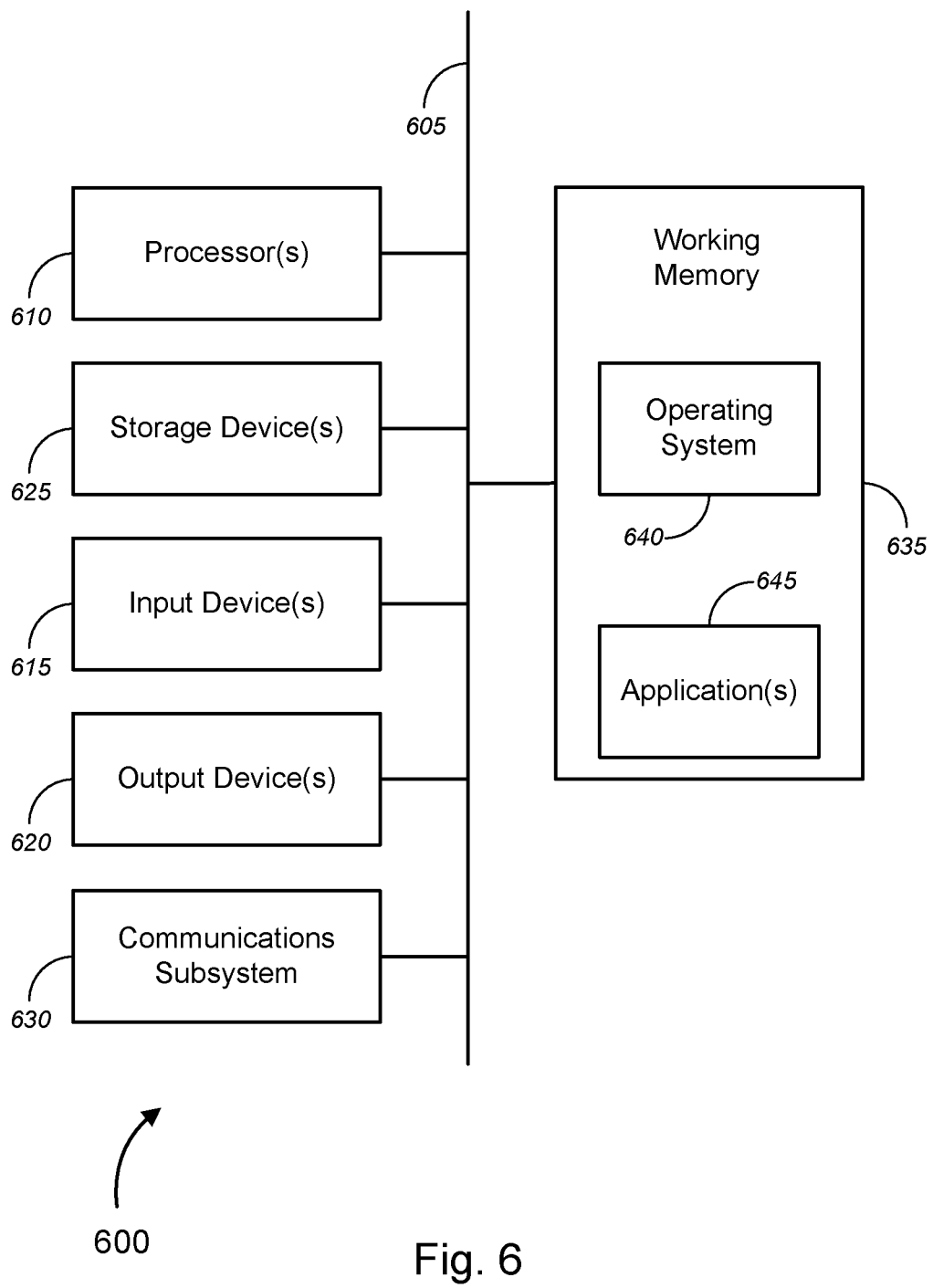
FIG. 6 is a generalized schematic diagram illustrating a computer system, in accordance with various embodiments.

FIG. 6 is a schematic block diagram of computer hardware for a communication device 100, in accordance with various embodiments, which as noted above, can be incorporated in the same (or a different) device as one or more of the sensors illustrated by FIG. 5. FIG. 6 provides a schematic illustration of one embodiment of a computer system 600 that can perform the methods provided by various other embodiments, as described herein. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more microprocessors, such as general-purpose processors and/or special-purpose processors (such as digital signal processing chips, graphics acceleration processors, and/or the like).

In general, embodiments can employ as a processor 610 any device (or combination of devices) that can operate to execute instructions to perform functions as described herein. Merely by way of example, and without limitation, any microprocessor (also sometimes referred to as a central processing unit, or "CPU") can be used as the processor 610, including without limitation one or more complex instruction set computing ("CISC") microprocessors, such as the single core and multicore processors available from Intel Corporation™ and others, such as Intel's X86 platform, including, e.g., the Pentium™, Core™, and Xeon™ lines of processors. Additionally and/or alternatively, reduced instruction set computing ("RISC") microprocessors, such as the IBM Power™ line of processors, processors employing chip designs by ARM Holdings™, and others can be used in many embodiments. In further embodiments, a processor might be a microcontroller, embedded processor, embedded system, system on a chip ("SoC") or the like.

As used herein, the term "processor" can mean a single processor or processor core (of any type) or a plurality of processors or processor cores (again, of any type) operating individually or in concert. Merely by way of example, the computer system 600 might include a general-purpose processor having multiple cores, a digital signal processor, and a graphics acceleration processor. In other cases, the computer system might 600 might include a CPU for general purpose tasks and one or more embedded systems or microcontrollers, for example, to run real-time functions. The functionality described herein can be allocated among the various processors or processor cores as needed for specific implementations. Thus, it should be noted that, while various examples of processors have been described herein for illustrative purposes, these examples should not be considered limiting.

The computer system 600 can also include one or more input devices 615, which can include without limitation a mouse, touchscreen, trackpad, keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 630 may permit data to be exchanged with a network (such as the network described below, to name one example), with other computer systems, and/or with any other devices described herein. In many embodiments, the computer system 600 will further comprise a working memory 635, which can include a RAM or ROM device, as described above.

The computer system 600 also may comprise software elements, shown as being currently located within the working memory 635, including an operating system 640, device drivers, executable libraries, and/or other code, such as one or more application programs 645, which may comprise computer programs provided by various embodiments, and/ or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operation in a specific fashion. In an embodiment implemented using the computer system 600, various computer readable media might be involved in providing instructions/code to processor(s) 610 for execution and/or might be used to store and/or carry such instructions/code (e.g., as signals). In many implementations, a computer readable medium is a non-transitory, physical and/or tangible storage medium. In some embodiments, a computer readable medium may take many forms, including but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, a RAM, a PROM, an EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Turning to FIGS. 7A-7D, the software executed by communication device 100 can provide a user interface 700. The user interface 700 allows users to interact with the communication device 100. For example, the user interface can be used to output information for a user, e.g., by displaying the information on a display device (including a heads up display device ("HUD"), printing information with a printer, playing audio through a speaker, etc.; the user interface can also function to receive input from a user, e.g., using standard input devices such as a mouse and other pointing devices, motion capture devices, touchpads and/or touchscreens, keyboards (e.g., numeric and/or alphabetic), microphones, etc.

The procedures undertaken to provide a user interface, therefore, can vary depending on the nature of the implementation; in some cases, providing a user interface can comprise displaying the user interface on a display device; in other cases, however, in which the user interface is displayed on a device remote from the computer system (such as on a client computer, wireless device, etc.), providing the user interface might comprise formatting data for transmission to such a device and/or transmitting, receiving and/or interpreting data that is used to create the user interface on the remote device. Alternatively and/or additionally, the user interface on a client computer (or any other appropriate user device) might be a web interface, in which the user interface is provided through one or more web pages that are served from a computer system (and/or a web server in communication with the computer system), and are received and displayed by a web browser on the client computer (or other capable user device). The web pages can display output from the computer system and receive input from the user (e.g., by using Web-based forms, via hyperlinks, electronic buttons, etc.). A variety of techniques can be used to create these Web pages and/or display/receive information, such as JavaScript, Java applications or applets, dynamic HTML and/or AJAX technologies, to name but a few examples.

In many cases, providing a user interface will comprise providing one or more display screens (a few examples of which are described below), each of which includes one or more user interface elements. As used herein, the term "user interface element" (also described as a "user interface mechanism" or a "user interface device") means any text, image, or device that can be displayed on a display screen for providing information to a user and/or for receiving user input. Some such elements are commonly referred to as "widgets," and can include, without limitation, text, text boxes, text fields, tables and/or grids, menus, toolbars, charts, hyperlinks, buttons, lists, combo boxes, checkboxes, radio buttons, and/or the like. While any illustrated exemplary display screens might employ specific user interface elements appropriate for the type of information to be conveyed/received by computer system in accordance with the described embodiments, it should be appreciated that the choice of user interface elements for a particular purpose is typically implementation-dependent and/or discretionary. Hence, the illustrated user interface elements employed by any display screens described herein should be considered exemplary in nature, and the reader should appreciate that other user interface elements could be substituted within the scope of various embodiments.

As noted above, in an aspect of certain embodiments, the user interface provides interaction between a user and a computer system. Hence, when this document describes procedures for displaying (or otherwise providing) information to a user, or to receiving input from a user, the user interface may be the vehicle for the exchange of such input/output. Merely by way of example, in a set of embodiments, the user interface allows the user (e.g., an operator of an excavator) to input information to calibrate the image sensor and the communication device to track the position and motion of an excavator stick 120 and bucket 125, as shown in FIG. 1.

FIGS. 7A-7D illustrate several panels of an exemplary user interface 700 that enables a user to interact with the position and motion tracking system on the communication device 100, in accordance with various embodiments. It should be noted that while the user interface 700 includes a combination of many different features, user interfaces in accordance with other embodiments might omit some or all of these features. Thus, while the illustrated user interface 700 is exemplary of certain embodiments, it should not be considered limiting.

Figure 7A:
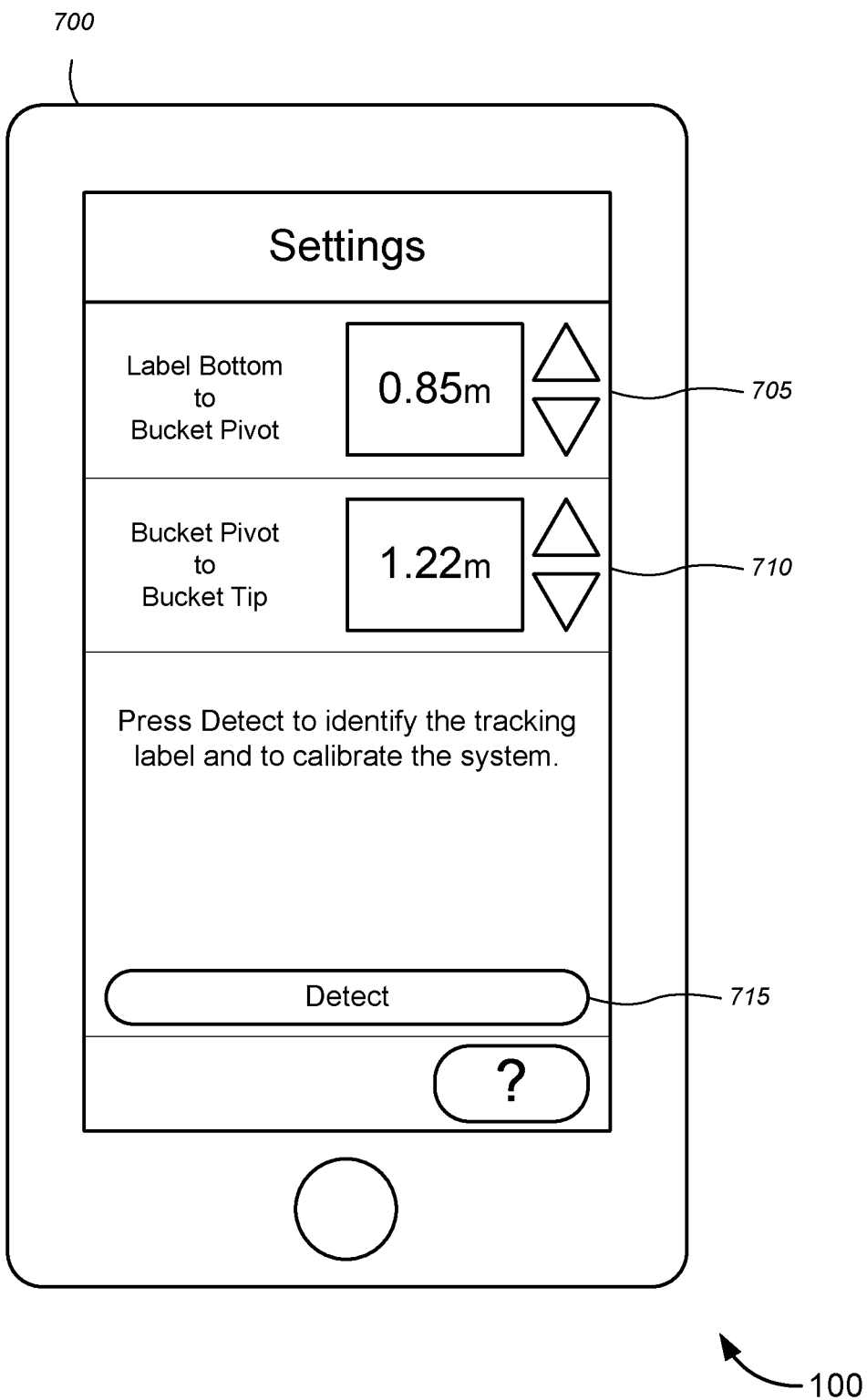
FIGS. 7A-7D illustrate user interface designs for interacting with the position and motion tracking system on the communication device, in accordance with various embodiments.

FIG. 7A represents a user interface 700 that may be used to calibrate the position and/or motion tracking system of the communication device 100. For example, a user may input the distance from the one or more reference features to the bucket pivot at user interface element 705, and/or the distance from the bucket pivot to the bucket tip at user interface element 710 (since the bucket bottom may be the point of interest, as it indicates the maximum depth of the bucket). By inputting the distances from the reference feature to the pivot and from the pivot to the bucket tip, the position and motion of the entire bucket may be tracked relative to the reference features on the excavator stick, and thus relative to the image sensor 105 in the cabin. These values might be saved between uses, and/or default values might be provided. The location of the reference feature(s) in one or more reference image(s) can be automatically detected, and the system calibrated (as noted above), by selecting user interface element 715.

Additional user inputs may be added on the calibration pane (or another pane) to enable the user to input values for the known position of the excavator stick and to input the type of reference feature that the image sensor should be detecting. For example, a user could input that the system should be detecting reference features on the stick of the excavator itself and/or optical targets mounted on the stick of the excavator.

Figure 7B:
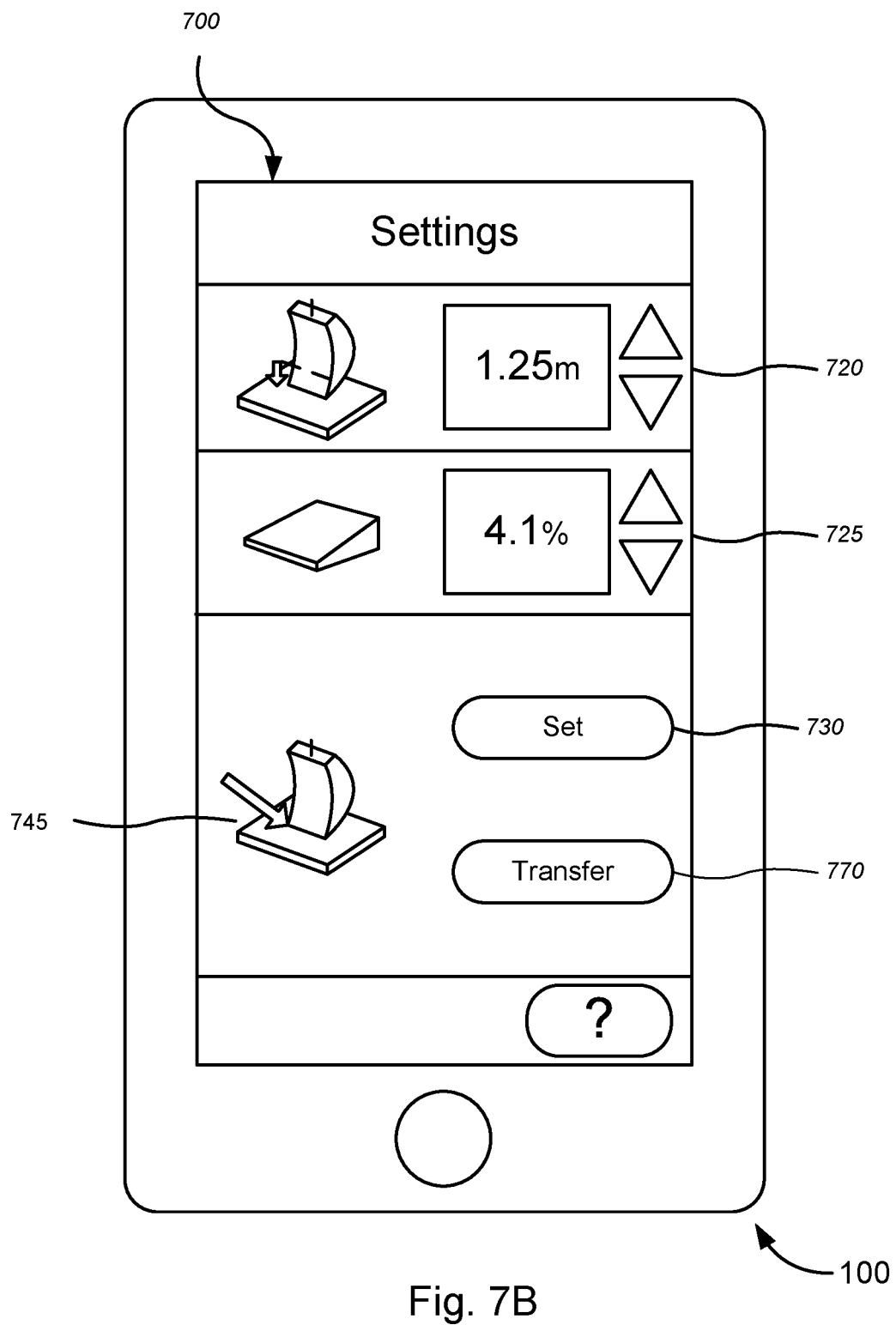

FIG. 7B represents a user interface pane for adjusting settings of the guidance parameters 700 including the height 720, the percentage slope 725 of a simple slope/benched excavation, and the indication of the excavation category slope/bench 745. By clicking the Up/Down arrows adjacent to the height setting 720 and the percentage slope setting 725, the user can increase/decrease both the height and the percentage slope values to fit the desired slope/bench to be excavated. Once finishing setup, the user may then select the "Set" button 730 to save these configurations for future use.

Additionally, the user may use the "Transfer" function 770 to correct for the change in elevation as the machine moves from one location to another location. For example, before the operator moves the excavator to a different location, he or she would rest the bucket of the excavator on a particular point (typically something firm) that can be reached again from a different location. Once the bucket of the excavator is placed on the particular point, the operator of the excavator presses the "transfer" button 770. The operator may then move the excavator to a different location and set the bucket of the excavator back on the same particular point. The operator may then accept the transfer from the previous location, keeping the target grade at the same elevation.

Figure 7C:
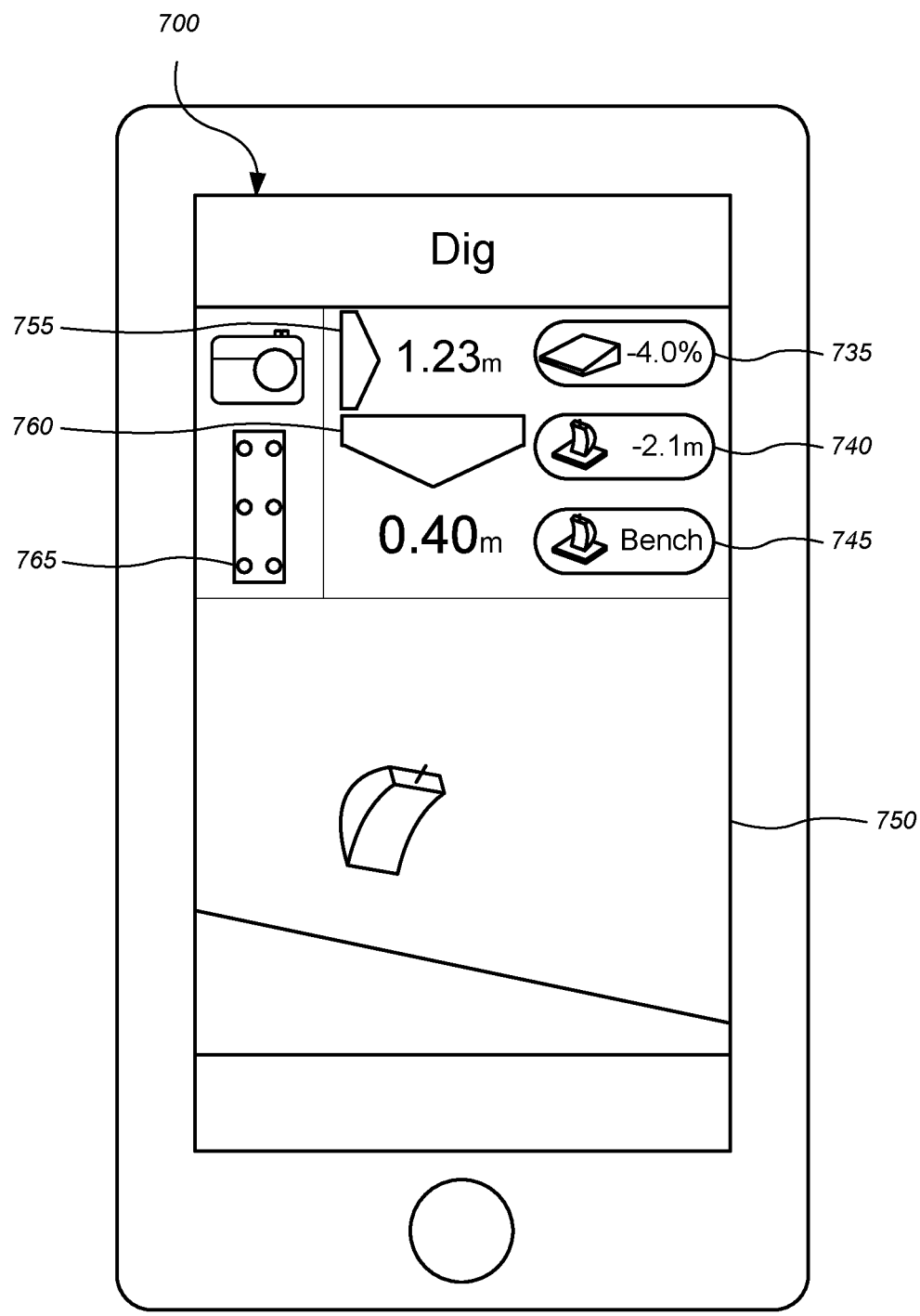
Figure 7D:
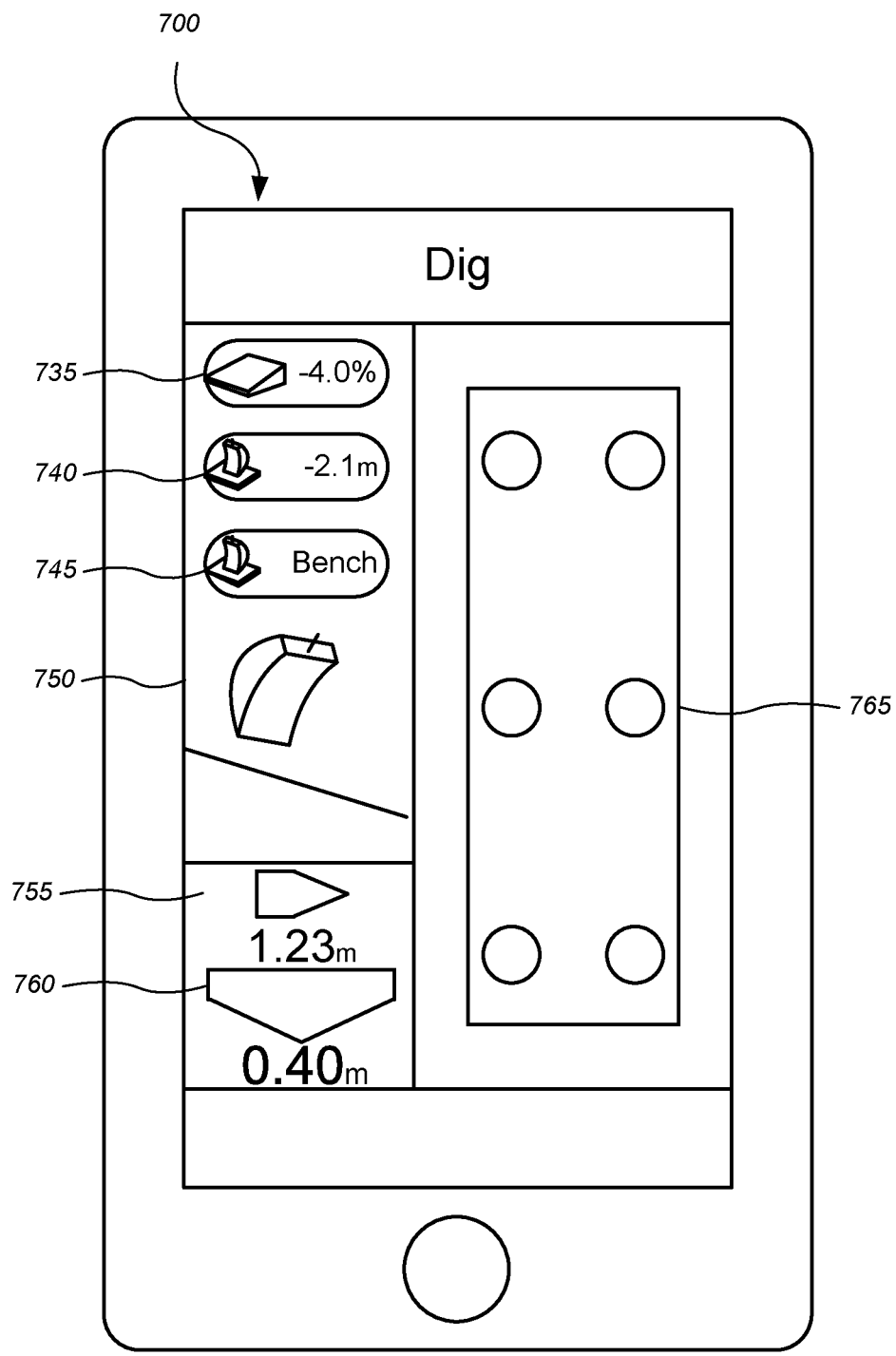

FIGS. 7C and 7D illustrate a user interface 700 that displays the location of the excavator stick and/or bucket relative to the image sensor 105. For example, the percentage slope 735, the height value 740 of the simple slope/benched excavation, and the indication of the excavation category slope/bench 745. In these examples, user interface elements (the percentage slope 735, the height 740, and the excavation type 745) can be adjusted using the pane described in FIG. 7B above. In addition, the interface 700 might show a reach value 755 and a depth value 760 of the bottom of the bucket (which might be relative to the orientation of the bucket at the time of calibration). A number of conventions can be used to indicate the direction of the reach and depth values. For instance, in the illustrated embodiment the right-facing arrow above the reach value indicates that the bucket is closer to the cabin than in the reference orientation (at calibration), while the downward-facing arrow above the depth value indicates that the bucket is below its reference orientation. The user interface might also display a current field of view of the camera 765 for the operator, and/or a profile view of the bucket relative to the ground surface 750. The operator may have the ability to adjust the bucket in real time based on the determined position of the bucket relative to the ground surface 750. As shown by FIG. 7D, each of these user interface elements can be rearranged to prioritize the information according to the user's preferences.

Exemplary Workflows

FIGS. 8-11 illustrate various methods that can be used to track the position and motion of the excavator stick 120 and excavator bucket 125 shown in FIG. 1, in many cases employing the image processing and calibration techniques described above. While the methods of FIGS. 8-11 are illustrated, for ease of description, as different methods, it should be appreciated that the various techniques and procedures of these methods can be combined in any suitable fashion, and that, in some embodiments, the methods depicted by FIGS. 8-11 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 8-11 can be implemented by (and, in some cases, are described below with respect to) the communication device 100 of FIG. 1 (or components thereof), these methods may also be implemented using any suitable hardware implementation. Similarly, while the communication device 100 of FIG. 1 (and/or components thereof) can operate according to the methods illustrated by FIGS. 8-11 (e.g., by executing instructions embodied on a computer readable medium), the communication device 100 can also operate according to other modes of operation and/or perform other suitable procedures.

Figure 8:
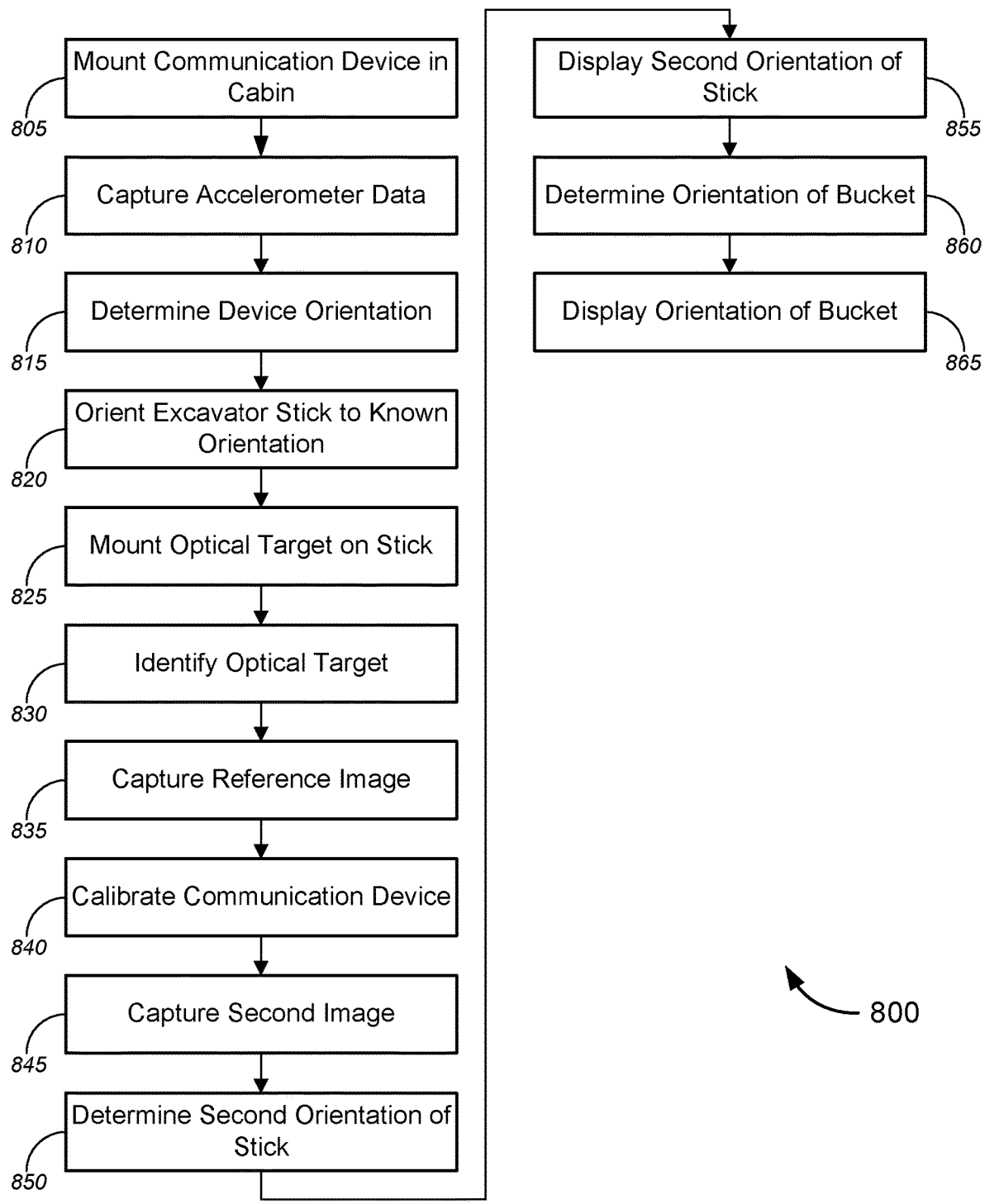
FIG. 8 is a process flow diagram illustrating a method of image analysis, in accordance with various embodiments.

FIG. 8 illustrates a method 800 of position and motion tracking of an excavator stick and/or bucket (such as those described above with respect to FIG. 1), and/or a portion thereof, such as the bottom of the bucket. In some embodiments, the method 800 comprises mounting a communication device with an image sensor in the cabin of the excavator (block 805). As noted above, there are several ways to mount the communication device in the cabin of the excavator. The communication device may be mounted substantially vertical in the cabin, such that the image sensor faces the stick of the excavator (e.g., so that the stick is in the center of the field of view of the image sensor, and the azimuth to the stick is essentially the azimuth of the boom), and the display of the communication device faces the excavator operator.

Once the communication device is mounted in the excavator, the communication device may capture data from an accelerometer incorporated within the device or in communication with the device (block 810). The data from the accelerometer may then be used to determine an orientation tilt angle of the communication device with respect to the ground (block 815). Although the communication device often will be mounted substantially vertical in the cabin of the excavator, there still may be an angle of tilt from the vertical, which correspondingly tilts the image sensor (camera) field of view from being centered on a horizontal plane. Readings from the accelerometer may be used to determine the angle of tilt of the device from the vertical. The determined angle may be used to calibrate the position of the camera and camera images to account for any tilt in the calculations of the stick orientation.

The stick of the excavator may then be oriented to a known orientation (block 820) in order to calibrate the motion and tracking system of the communication device. One or more reference features (e.g. an optical target), with known relative positions to each other, may be mounted on the stick of the excavator (block 825). Alternatively and/or additionally, one or more features of the excavator stick itself (e.g., company logos, an edge, etc.) may be used as reference features. The optical targets may be selected and/or mounted in such a way as to optimize the ability of the system to recognize the targets and employ reference features thereof in accordance with the procedures discussed herein. The communication device may then capture an image (which may be a still frame, video sequence, etc.) with the image sensor and detect the one or more optical targets (or other reference features) mounted on the stick of the excavator (block 830), for example using the automatic corner detection procedures described above. Alternatively or additionally, the identification of the optical targets (or other reference features) can involve user interaction, for example, the user touching a portion of the device's display screen (which might be displaying the captured image) to select the reference features/optical targets.

The method 800 may further comprise capturing, with the image sensor, one or more reference images (which, again, may be still images, video sequences, etc.) of the optical targets with the camera (block 835). (Note that the identification of the optical target (block 830) can be performed in conjunction with capturing the reference images, such that the optical target/reference features can be identified initially from the reference image(s)). The communication device may automatically detect, with the camera and without user input, the location of the optical targets (or other reference features) in the reference images, for example, using the procedures described above, by pixel comparison with an earlier-identified optical target (or other reference features), etc. The method 800 can further comprise calibrating the mobile communication device (block 840) based on the orientations of the plurality of reference features in the reference image and the orientation of the mobile communication device to the ground. This calibration can be performed, in some embodiments, as described above, to eliminate any error caused by lens distortion, etc. and can further "initialize" the system to set a "zero" reference point for the stick/bucket from which movement of the stick and/or bucket can be measured.

After the mobile communication device is calibrated, the image sensor of the communication device may capture at least one additional image of the excavator stick (block 845). Once again, the communication device may automatically detect, with the camera and without user input, a second location of the optical targets in the second image. At least one additional orientation of the excavator stick may be determined based on at least one additional image (block 850), for example, using the techniques described above.

The second orientation of the stick of the excavator may be obtained by comparing the second image of the excavator stick with the reference image (i.e., the projections of the known target pattern in the image plane) of the excavator stick and determining the second orientation of the stick relative to the reference image orientation of the stick of the excavator. Further, the second orientation of the stick may be further refined by incorporating the orientations of the one or more reference features in the second image with the corresponding orientations and/or positions of the one or more reference features in the reference image. The orientations may comprise positions and/or orientations of the one or more reference features in the respective images with respective to the camera.

In one aspect, the second orientation of the stick may comprise a reach of the stick and a depth of the stick, which may be expressed as changes from the known position of the stick (at which position the device was calibrated). In other cases, as described above, for example, second orientation of the excavator stick may be determined relative to a local or global coordinate system. For instance, if the position of the mobile device is known (e.g., from input from a position sensor), or the first position of the stick is known relative to a coordinate system (for example, by obtaining a position solution with a total station, etc.), the system might calculate the new position of the stick in its second orientation based on changes from the known first position. (In some cases, an azimuth solution for the second orientation of the stick may be obtained, as described above and further described below with respect to FIG. 9.)

The orientation of the stick of the excavator including the reach of the stick, depth of the stick, and/or position of the stick relative to a local or global coordinate system may then be displayed to the user of the communication device and/or operator of the excavator (block 855), for example, with user interface panes similar to those described above with respect to FIGS. 7A-7D. The communication device may further determine an orientation of the bucket of the excavator (block 860). Merely by way of example, the settings of the mobile device might store data about a relative orientation of the bucket and the stick, such that, once the orientation of the stick is known, the orientation of the bucket (or a specific point on the bucket, such as the bottom of the bucket), can be determined from the determined position of the stick. For example, in some cases, a user may input the distance of the bucket pivot from selected reference points on the stick and/or the distance from the bucket pivot to the bucket tip, and that data can be stored in the system settings on the communication device. The device may then calculate the orientation of the bucket of the excavator and display the orientation of the bucket including the reach of the bucket, depth of the bucket, and/or position of the bucket relative to a local or global coordinate system to the user of the communication device and/or operator of the excavator (block 865), for example, as depicted in FIGS. 7C and 7D.

As noted above, in some cases, it may be desirable to determine how much the stick has moved laterally (from the perspective of the image sensor) and/or in an azimuthal direction (around the cabin of the excavator). In some cases, an internal compass, gyroscope, or other azimuth-determination system in the communication device could be used to measure the initial azimuth (at calibration) and a second azimuth (after rotation of the cab). The field of view of the camera is not a limitation on how many degrees in azimuth (which is measured wider than the field of view of the camera) the system can accommodate because more than one external reference feature may be used to determine the azimuth of the excavator as the excavator rotates.

Figure 9:
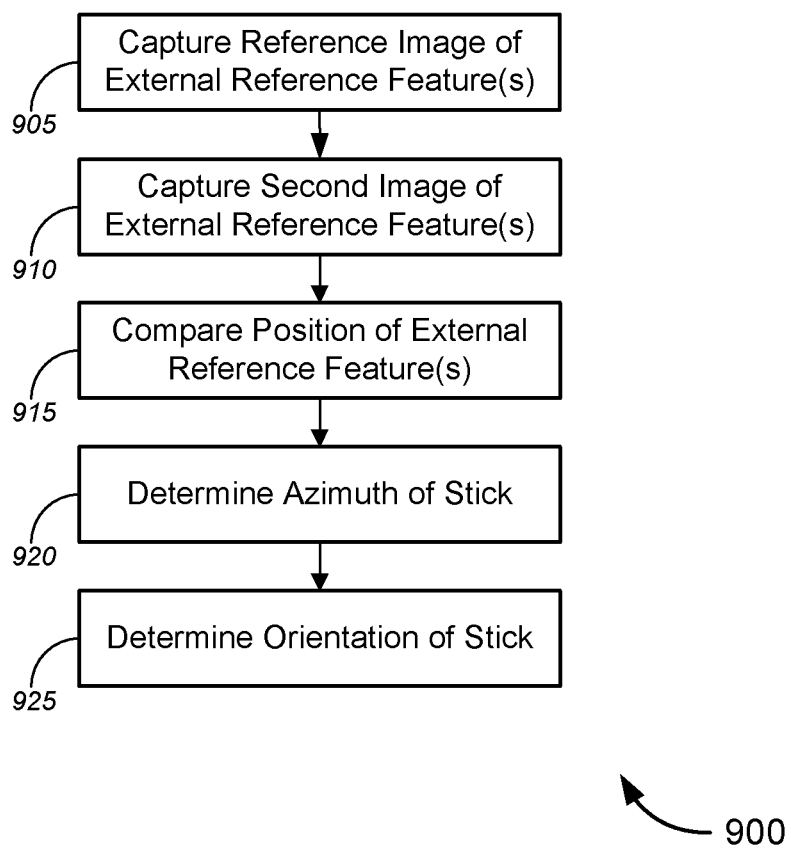
FIG. 9 is a process flow diagram illustrating a method of determining an azimuth, in accordance with various embodiments.

Alternatively and/or additionally, FIG. 9 illustrates a method 900 for determining a change in an azimuth from the communication device of the stick of the excavator. The method 900 can comprise capturing a reference image of at least one external reference feature (e.g., as shown in FIGS. 4A and 4B) (block 905). The external reference features may be in a known and fixed position on the site and can be any of a number of objects (many of which are described above), so long as the external reference features are identifiable by the system in images captured by the image sensor. The excavator may adjust its position (e.g., by rotating, etc.), and at least one additional image of the at least one external reference feature may be captured (block 910). The position (e.g., pixel coordinate) of the at least one external reference feature in the reference image may be compared with the position (e.g., pixel coordinate) of the at least one external reference feature in the second image (block 915) to determine the azimuth to the stick of the excavator (block 920) in the second position/image relative to the original azimuth of the stick in the first image. If the azimuth to the stick in the original position is known (for example, based on compass data, azimuth data input by the user and stored, etc.), the real azimuth to the stick in the second position can be determined, and from that azimuth and the determined reach, the orientation of the stick relative to a local or global coordinate system can be determined (block 925), as noted above.

Figure 10:
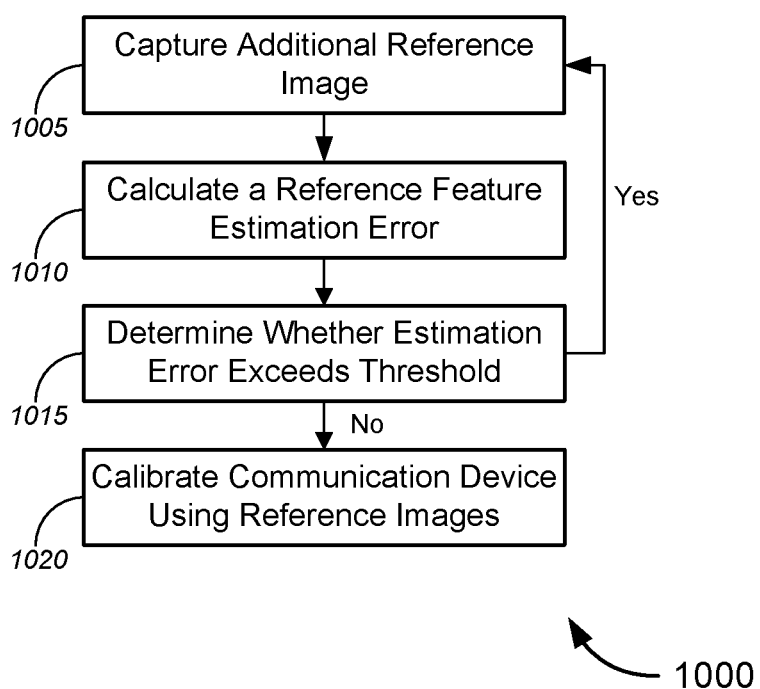
FIGS. 10 and 11 are process flow diagrams illustrating methods of determining estimation error, in accordance with various embodiments.

In some cases, the calibration of the communication device might include calculating an estimation error, which can then be used to ensure that an image provides sufficiently good data to calibrate the device. A similar procedure might be used to ensure that data from the accelerometer is sufficient to provide an acceptable measure of the device tilt. Accordingly FIG. 10 illustrates a method 1000 of calculating an estimation error of the image sensor of the communication device, which can be incorporated into the calibration of the device (as described above, for example), and which can ensure that the image data collected by the device is sufficient to enable the methodology described herein. The method 1000 can include capturing, in addition to the first reference image, an additional reference image of the excavator stick (in the known position) (block 1005). A reference feature estimation error may be calculated by comparing the determined parameters of the first reference image with the determined parameters of the second reference image and calculating the error between the parameters of the two images (block 1010).

Next, the method 1000 may comprise determining whether the estimation error exceeds a specified threshold, i.e. the average error between the measured feature points and the computed image points from the projective model should be less than half a pixel (block 1015). If the estimation error exceeds the specified threshold, the method 1000 reiterates from block 1005, as shown by the arrow on FIG. 10. This process can be repeated until the estimation error is within the threshold value, the communication device may be calibrated based on some or all of the collected reference images (block 1020). For example, if there is a low estimation error between a second and third reference images, the first image may be discarded, and the device may be calibrated from the second and third reference images. By contrast, if the second image is the outlier, the device may be calibrated from the first and third reference images.

Figure 11:
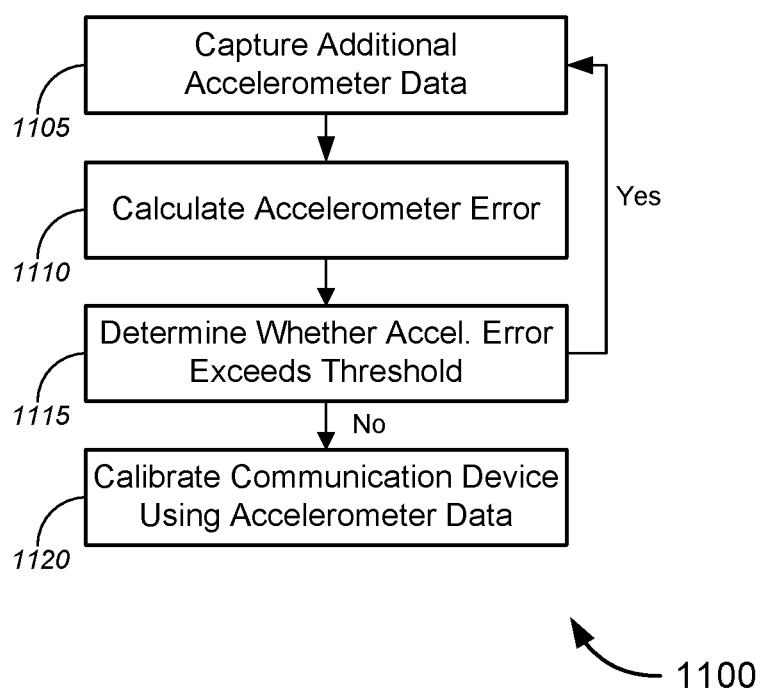

In like fashion, FIG. 11 illustrates a method 1100 of calculating the estimation error of the accelerometer of the communication device. In accordance with the method 1100, first accelerometer data can be captured as described above. In addition, the system might capture additional accelerometer data (block 1105). An accelerometer estimation error may be calculated by comparing the determined accelerometer value from the first accelerometer data with the second determined accelerometer value from the second accelerometer data and calculating the error between the two values (block 1110).

Next, the method 1100 may comprise determining whether the estimated error of the accelerometer exceeds a specified threshold (block 1115), typically within one to two degrees. If the estimated error exceeds the specified threshold, the process can repeat from block 1105 (as illustrated by the arrow on FIG. 11). The capturing of additional accelerometer data may be repeated until the accelerometer estimation error no longer exceeds the specified threshold; once the estimation error no longer exceeds the specified threshold, the communication device may be calibrated based on some or all of the captured data from the accelerometer (block 1120). For example, as noted above with respect to the estimation error, if one accelerometer data set is a clear source of error, that set can be excluded, and the remaining sets can be used to calibrate the device.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A mobile communication device, comprising:
    an image sensor;
    an accelerometer;
    a display;
    one or more processors in communication with the image sensor, the accelerometer, and the display; and
    a computer readable medium in communication with the one or more processors, the computer readable medium having encoded thereon a set of instructions executable by the mobile communication device to:
        capture, with the image sensor of the mobile communication device, a reference image of a plurality of reference features on a stick of an excavator while the stick of the excavator is at a known orientation;
        capture input from the accelerometer of the mobile communication device;
        determine an orientation of the mobile communication device, based at least in part on the input from the accelerometer of the mobile communication device;
        calibrate the mobile communication device, based on orientations of the plurality of reference features in the reference image and the orientation of the mobile communication device;
        capture, with the image sensor of the mobile communication device, a second image of the plurality of reference features on the stick of the excavator;
        determine, from orientations of the plurality of reference features in the second image, a second orientation of the stick of the excavator; and
        display, with the display of the mobile communication device, an indication of the determined second orientation of the stick of the excavator.

2. The mobile communication device of claim 1, wherein the set of instructions are further executable by the mobile communication device to determine, from the determined second orientation of the stick of the excavator, an orientation of a bucket of the excavator, wherein displaying the indication of the determined second orientation of the stick of the excavator comprises displaying an indication of the determined orientation of the bucket of the excavator.

3. The mobile communication device of claim 1, wherein the plurality of reference features comprise one or more reference features of one or more designated optical targets on the stick of the excavator.

4. The mobile communication device of claim 3, wherein the set of instructions are further executable by the mobile communication device to automatically identify, without human input, depictions of the one or more designated optical targets in the reference image.

5. The mobile communication device of claim 1, wherein the plurality of reference features comprises one or more reference features identified from a structure of the stick of the excavator.

6. The mobile communication device of claim 1, wherein determining the second orientation of the stick of the excavator comprises determining the second orientation relative to the reference orientation of the stick of the excavator.

7. The mobile communication device of claim 6, wherein determining the second orientation of the stick of the excavator comprises determining a reach of the stick of the excavator in the second orientation.

8. The mobile communication device of claim 6, wherein determining the second orientation of the stick of the excavator comprises determining a depth of the stick of the excavator in the second orientation.

9. The mobile communication device of claim 1, wherein determining the second orientation of the stick of the excavator comprises comparing orientations of the one or more reference features in the second image with orientations of the one or more reference features in the reference image.

10. The mobile communication device of claim 9, wherein orientations of the one or more reference features comprise positions of the one or more reference features in the reference image and in the second image.

11. The mobile communication device of claim 9, wherein orientations of the one or more reference features comprise dimensions of the one or more reference features in the reference image and in the second image.

12. The mobile communication device of claim 1, wherein determining the second orientation of the stick of the excavator comprises determining an azimuth of the stick of the excavator in the second orientation.

13. The mobile communication device of claim 12, wherein the set of instructions are further executable by the mobile communication device to capture, with the image sensor of the mobile communication device, a second reference image of one or more external reference features of an environment around the excavator, wherein the second image comprises the one or more external reference features, and wherein determining the azimuth of the stick of the excavator comprises comparing positions of the one or more external reference features in the second image with positions of the one or more external reference features in the second reference image.

14. The mobile communication device of claim 1, wherein determining the second orientation of the stick of the excavator comprises determining the second orientation relative to a local or global coordinate system.

15. The mobile communication device of claim 1, wherein the set of instructions are further executable by the mobile communication device to:
capture, with the image sensor of the mobile communication device, a second reference image of the plurality of reference features on the stick of the excavator while the stick of the excavator is at a known orientation;
calculate, based on orientations of the plurality of reference features in the reference image and the second reference image, a reference feature estimation error associated with each reference feature;
determine whether the reference feature estimation error exceeds a specified threshold;
based on a determination that the reference feature estimation error exceeds the specified threshold, capture, with the image sensor of the mobile communication device, at least one additional reference image of the plurality of reference features;
recalculate the reference feature estimation error associated with each reference feature; and
repeat the operations of capturing additional reference images of the plurality of reference features on the stick of the excavator, calculating the reference feature estimation error, and determining whether the reference feature estimation error exceeds the specified threshold until the reference feature estimation error no longer exceeds the specified threshold;
wherein calibrating the mobile communication device comprises calibrating the mobile communication device based on orientations of the plurality of reference features in at least two of the reference images.

16. The mobile communication device of claim 1, wherein the set of instructions are further executable by the mobile communication device to:
calculate, based on the captured input from the accelerometer, an orientation estimation error associated with the orientation of the mobile communication device;
determine whether the orientation estimation error exceeds a specified threshold;
based on a determination that the orientation estimation error exceeds the specified threshold, capture additional input from the accelerometer of the mobile communication device;
recalculate the orientation estimation error based upon the additional input from the accelerometer; and
repeat the operations of capturing input from the accelerometer, calculating the orientation estimation error, and determining whether the orientation estimation error exceeds the specified threshold until the orientation estimation error no longer exceeds the specified threshold;
wherein calibrating the mobile communication device further comprises calibrating the mobile communication device based on one or more of the captured inputs from the accelerometer.

17. The mobile communication device of claim 1, wherein the mobile communication device is one of a wireless phone or a tablet computer.

18. The mobile communication device of claim 1, wherein the mobile communication device is mounted in a cabin of the excavator.

19. The mobile communication device of claim 1, further comprising a gyroscope in communication with the one or more processors, wherein the instructions to determine the orientation of the mobile communication device comprise instructions to determine the orientation based at least in part on input from the accelerometer and input from the gyroscope.

20. An apparatus, comprising:
a non-transitory computer readable medium having encoded thereon a set of instructions executable by a mobile communication device to:
capture, with an image sensor of the mobile communication device, a reference image of a plurality of reference features on a stick of an excavator while the stick of the excavator is at a known orientation;
capture input from an accelerometer of the mobile communication device;
determine an orientation of the mobile communication device, based at least in part on the input from the accelerometer of the mobile communication device;
calibrate the mobile communication device, based on orientations of the plurality of reference features in the reference image and the orientation of the mobile communication device;
capture, with the image sensor of the mobile communication device, a second image of the plurality of reference features on the stick of the excavator;
determine, from orientations of the plurality of reference features in the second image, a second orientation of the stick of the excavator; and
display, with a display of the mobile communication device, an indication of the determined second orientation of the stick of the excavator.

21. A method, comprising:
capturing, with an image sensor of a mobile communication device, a reference image of a plurality of reference features on a stick of an excavator while the stick of the excavator is at a known orientation;
capturing input from an accelerometer of the mobile communication device;
determining an orientation of the mobile communication device, based at least in part on the input from the accelerometer of the mobile communication device;
calibrating the mobile communication device, based on orientations of the plurality of reference features in the reference image and the orientation of the mobile communication device;
capturing, with the image sensor of the mobile communication device, a second image of the plurality of reference features on the stick of the excavator;
determining, from orientations of the plurality of reference features in the second image, a second orientation of the stick of the excavator; and
displaying, with a display of the mobile communication device, an indication of the determined second orientation of the stick of the excavator.

* * * * *